US008200676B2

(12) United States Patent
Frank

(10) Patent No.: US 8,200,676 B2
(45) Date of Patent: Jun. 12, 2012

(54) USER INTERFACE FOR GEOGRAPHIC SEARCH

(75) Inventor: John R. Frank, Cambridge, MA (US)

(73) Assignee: Nokia Corporation, Espoo (FI)

(*) Notice: Subject to any disclaimer, the term of this patent is extended or adjusted under 35 U.S.C. 154(b) by 36 days.

(21) Appl. No.: 11/427,165

(22) Filed: Jun. 28, 2006

(65) Prior Publication Data

US 2007/0011150 A1    Jan. 11, 2007

Related U.S. Application Data

(60) Provisional application No. 60/694,614, filed on Jun. 28, 2005.

(51) Int. Cl.
*G06F 17/30* (2006.01)
(52) U.S. Cl. .................. 707/749; 707/723; 707/748
(58) Field of Classification Search .................. 715/513; 705/500; 701/208; 707/729, 749, 723, 748
See application file for complete search history.

(56) References Cited

U.S. PATENT DOCUMENTS

| | | |
|---|---|---|
| 5,032,989 A | 7/1991 | Tornetta |
| 5,623,541 A | 4/1997 | Boyle et al. |
| 5,659,732 A | 8/1997 | Kirsch |
| 5,664,115 A | 9/1997 | Fraser |
| 5,668,897 A | 9/1997 | Stolfo |
| 5,761,538 A | 6/1998 | Hull et al. |
| 5,778,362 A | 7/1998 | Deerwester et al. |
| 5,802,361 A | 9/1998 | Wang et al. |
| 5,839,088 A | 11/1998 | Hancock et al. |
| 5,845,278 A | 12/1998 | Kirsch et al. |
| 5,852,810 A | 12/1998 | Sotiroff et al. |
| 5,856,060 A | 1/1999 | Kawamura et al. |
| 5,870,559 A | 2/1999 | Leshem et al. |
| 5,878,126 A | 3/1999 | Velamuri et al. |
| 5,893,093 A | 4/1999 | Wills |
| 5,920,856 A | 7/1999 | Syeda-Mahmood |
| 5,930,474 A | 7/1999 | Dunworth et al. |
| 5,958,008 A | 9/1999 | Pogrebisky et al. |
| 5,960,447 A * | 9/1999 | Holt et al. ............ 715/201 |
| 5,961,572 A | 10/1999 | Craport et al. |
| 5,963,956 A | 10/1999 | Smartt |
| 5,978,747 A | 11/1999 | Craport et al. |
| 5,978,804 A | 11/1999 | Dietzman |
| 5,991,754 A | 11/1999 | Raitto et al. |

(Continued)

FOREIGN PATENT DOCUMENTS

EP    1 426 876 A    6/2004

(Continued)

OTHER PUBLICATIONS

GeoXwalk, by Colin Matheson and James S. Reid, dated Aug. 2004.*

(Continued)

*Primary Examiner* — Shahid Alam
(74) *Attorney, Agent, or Firm* — Ditthavong Mori & Steiner, P.C.

(57) ABSTRACT

A computer-implemented method of processing a geotext query, said method involving: receiving a first free-text query string from a user; and decomposing the first free-text query into a non-geographic query and a geographic query, wherein the non-geographic query is a second free-text query string derived from the first free-text query string and the geographic query is a geographical location description.

25 Claims, 17 Drawing Sheets

U.S. PATENT DOCUMENTS

| | | | |
|---|---|---|---|
| 5,991,781 A | 11/1999 | Nielsen | |
| 6,035,297 A | 3/2000 | Van Huben et al. | |
| 6,052,691 A | 4/2000 | Ardoin et al. | |
| 6,057,842 A | 5/2000 | Knowlton et al. | |
| 6,070,157 A | 5/2000 | Jacobson et al. | |
| 6,092,076 A | 7/2000 | McDonough et al. | |
| 6,133,913 A | 10/2000 | White et al. | |
| 6,144,962 A | 11/2000 | Weinberg et al. | |
| 6,148,260 A | 11/2000 | Musk et al. | |
| 6,148,289 A | 11/2000 | Virdy | |
| 6,151,624 A | 11/2000 | Teare et al. | |
| 6,184,823 B1 | 2/2001 | Smith et al. | |
| 6,202,065 B1 | 3/2001 | Wills | |
| 6,233,618 B1 | 5/2001 | Shannon | |
| 6,236,768 B1 | 5/2001 | Rhodes et al. | |
| 6,237,006 B1 | 5/2001 | Weinberg et al. | |
| 6,240,410 B1 | 5/2001 | Wical | |
| 6,240,413 B1 | 5/2001 | Learmont | |
| 6,249,252 B1 | 6/2001 | Dupray | |
| 6,269,368 B1 | 7/2001 | Diamond | |
| 6,275,610 B1 | 8/2001 | Hall et al. | |
| 6,282,540 B1 | 8/2001 | Goldensher et al. | |
| 6,295,528 B1 | 9/2001 | Marcus et al. | |
| 6,341,310 B1 | 1/2002 | Leshem et al. | |
| 6,343,139 B1 | 1/2002 | Finkelstein et al. | |
| 6,343,290 B1 | 1/2002 | Cossins et al. | |
| 6,366,851 B1 | 4/2002 | Chojnacki et al. | |
| 6,377,961 B1 | 4/2002 | Ryu et al. | |
| 6,397,228 B1 | 5/2002 | Lamburt et al. | |
| 6,411,293 B1 | 6/2002 | Sakamoto et al. | |
| 6,470,287 B1 | 10/2002 | Smartt | |
| 6,470,383 B1 | 10/2002 | Leshem et al. | |
| 6,493,711 B1 | 12/2002 | Jeffrey | |
| 6,542,813 B1 * | 4/2003 | Kovacs | 701/208 |
| 6,556,990 B1 | 4/2003 | Lane | |
| 6,577,714 B1 | 6/2003 | Darcie et al. | |
| 6,584,459 B1 | 6/2003 | Chang et al. | |
| 6,629,065 B1 | 9/2003 | Gadh et al. | |
| 6,631,364 B1 | 10/2003 | Rioux et al. | |
| 6,640,145 B2 | 10/2003 | Hoffberg et al. | |
| 6,701,307 B2 | 3/2004 | Himmelstein et al. | |
| 6,721,728 B2 | 4/2004 | McGreevy | |
| 6,731,314 B1 | 5/2004 | Cheng et al. | |
| 6,741,981 B2 | 5/2004 | McGreevy | |
| 6,823,333 B2 | 11/2004 | McGreevy | |
| 6,850,252 B1 | 2/2005 | Hoffberg | |
| 6,853,389 B1 | 2/2005 | Ikeda et al. | |
| 6,862,586 B1 | 3/2005 | Kreulen et al. | |
| 6,934,710 B1 | 8/2005 | Mills | |
| 7,007,228 B1 | 2/2006 | Carro et al. | |
| 7,017,285 B2 | 3/2006 | Lakic | |
| 7,024,403 B2 | 4/2006 | Kyler | |
| 7,035,869 B2 | 4/2006 | Smartt | |
| 7,065,532 B2 | 6/2006 | Elder et al. | |
| 7,107,285 B2 | 9/2006 | von Kaenel et al. | |
| 7,117,199 B2 | 10/2006 | Frank et al. | |
| 7,143,344 B2 * | 11/2006 | Parker et al. | 715/236 |
| 7,163,739 B2 | 1/2007 | Koike et al. | |
| 7,233,942 B2 | 6/2007 | Nye et al. | |
| 7,274,332 B1 | 9/2007 | Dupray | |
| 7,310,633 B1 | 12/2007 | Wang et al. | |
| 7,325,201 B2 | 1/2008 | Ferrari et al. | |
| 7,353,113 B2 | 4/2008 | Sprague et al. | |
| 7,393,924 B2 | 7/2008 | Vitaliano et al. | |
| 7,411,204 B2 | 8/2008 | Appleby et al. | |
| 7,428,528 B1 | 9/2008 | Ferrari et al. | |
| 7,437,703 B2 | 10/2008 | Wu | |
| 7,473,843 B2 | 1/2009 | Wang et al. | |
| 7,483,025 B2 | 1/2009 | Roy et al. | |
| 7,539,693 B2 | 5/2009 | Frank et al. | |
| 2001/0011270 A1 | 8/2001 | Himmelstein et al. | |
| 2001/0011365 A1 | 8/2001 | Helfman | |
| 2002/0000999 A1 | 1/2002 | McCarty et al. | |
| 2002/0016796 A1 | 2/2002 | Hurst et al. | |
| 2002/0076099 A1 | 6/2002 | Sakamoto et al. | |
| 2002/0078035 A1 | 6/2002 | Frank et al. | |
| 2002/0082901 A1 | 6/2002 | Dunning et al. | |
| 2002/0151992 A1 | 10/2002 | Hoffberg et al. | |
| 2002/0161736 A1 | 10/2002 | Beygelzimer et al. | |
| 2002/0188599 A1 | 12/2002 | McGreevy | |
| 2003/0004914 A1 | 1/2003 | McGreevy | |
| 2003/0005053 A1 | 1/2003 | Novaes | |
| 2003/0037048 A1 | 2/2003 | Kabra et al. | |
| 2003/0078913 A1 | 4/2003 | McGreevy | |
| 2003/0097357 A1 | 5/2003 | Ferrari et al. | |
| 2003/0187867 A1 | 10/2003 | Smartt | |
| 2004/0093328 A1 | 5/2004 | Damle | |
| 2004/0095376 A1 | 5/2004 | Graham et al. | |
| 2004/0117358 A1 | 6/2004 | von Kaenel et al. | |
| 2004/0119759 A1 | 6/2004 | Barros | |
| 2004/0139400 A1 | 7/2004 | Allam et al. | |
| 2004/0236730 A1 | 11/2004 | Frank | |
| 2005/0004910 A1 | 1/2005 | Trepess | |
| 2005/0008849 A1 | 1/2005 | Kagami et al. | |
| 2005/0091193 A1 | 4/2005 | Frank et al. | |
| 2005/0108213 A1 | 5/2005 | Riise et al. | |
| 2005/0108224 A1 | 5/2005 | Silverbrook et al. | |
| 2005/0119824 A1 | 6/2005 | Rasmussen et al. | |
| 2005/0193003 A1 | 9/2005 | Popovici | |
| 2005/0198008 A1 | 9/2005 | Adler | |
| 2005/0222879 A1 | 10/2005 | Dumas et al. | |
| 2005/0246310 A1 | 11/2005 | Chang et al. | |
| 2005/0270311 A1 | 12/2005 | Rasmussen et al. | |
| 2005/0278378 A1 | 12/2005 | Frank | |
| 2005/0278616 A1 * | 12/2005 | Eller | 715/513 |
| 2006/0004752 A1 | 1/2006 | Harel et al. | |
| 2006/0036588 A1 | 2/2006 | Frank et al. | |
| 2006/0122794 A1 | 6/2006 | Sprague et al. | |
| 2006/0149774 A1 | 7/2006 | Egnor | |
| 2006/0155679 A1 | 7/2006 | Kothuri et al. | |
| 2006/0159367 A1 | 7/2006 | Zeineh et al. | |
| 2006/0174209 A1 | 8/2006 | Barros | |
| 2006/0184519 A1 | 8/2006 | Smartt | |
| 2006/0200259 A1 | 9/2006 | Hoffberg et al. | |
| 2006/0200260 A1 | 9/2006 | Hoffberg et al. | |
| 2006/0224587 A1 | 10/2006 | Zamir et al. | |
| 2006/0271281 A1 | 11/2006 | Ahn et al. | |
| 2007/0011150 A1 | 1/2007 | Frank | |
| 2007/0016562 A1 | 1/2007 | Cooper | |
| 2007/0078768 A1 | 4/2007 | Dawson | |
| 2007/0130112 A1 | 6/2007 | Lin | |
| 2007/0156677 A1 | 7/2007 | Szabo | |
| 2007/0179932 A1 | 8/2007 | Piaton | |
| 2007/0192300 A1 | 8/2007 | Reuther et al. | |
| 2007/0198495 A1 | 8/2007 | Buron et al. | |
| 2007/0233692 A1 | 10/2007 | Lisa et al. | |
| 2007/0239692 A1 | 10/2007 | McBride | |
| 2007/0288160 A1 * | 12/2007 | Ebert | 701/207 |
| 2007/0294233 A1 | 12/2007 | Sheu et al. | |
| 2008/0010262 A1 | 1/2008 | Frank | |
| 2008/0033935 A1 | 2/2008 | Frank | |
| 2008/0033936 A1 | 2/2008 | Frank | |
| 2008/0033944 A1 | 2/2008 | Frank | |
| 2008/0040336 A1 | 2/2008 | Frank | |
| 2008/0052638 A1 | 2/2008 | Frank et al. | |
| 2008/0056538 A1 | 3/2008 | Frank | |
| 2008/0059452 A1 | 3/2008 | Frank | |
| 2008/0065685 A1 | 3/2008 | Frank | |
| 2008/0131003 A1 | 6/2008 | Bober | |
| 2009/0119255 A1 | 5/2009 | Frank et al. | |
| 2009/0183097 A1 | 7/2009 | Bayiates | |

FOREIGN PATENT DOCUMENTS

| | | |
|---|---|---|
| GB | 2364225 | 1/2002 |
| WO | WO-2005/114484 | 12/2005 |
| WO | WO-2007/002800 | 1/2007 |

OTHER PUBLICATIONS

International Search Report, PCT/US2006/02596, mailed Dec. 8, 2006, 2 pages.

Beard and Sharma, Multidimensional ranking for data in digital spatial libraries, Int. J. Digit. Libr. 1, pp. 153-160 (1997).

Chen, et al., "The BioPortal Project: A National Center of Excellence for Infectious Disease Informatics", Proceedings of the 2006 International Conference on Digital Government Research, May 21-24, 2006, pp. 373-374.

Christel, M.G. et al., "Interactive Maps for a Digital Video Library", IEEE Multimedia, IEEE Service Center, New York, vol. 7, No. 1, Jan. 2000, pp. 60-67.

Clifton, et al., "GeoNODE: An End-to-End System from Research Components", the 17th Internationall Conference on Data Engineering, Heidelberg, Germany, Apr. 2-6, 2001.

Duhring, "Geospatial Archive and Exploitation System", SGI White Paper, pp. 1-12 (Dec. 2001), 14 pages.

European Patent Office, Supplementary Partial European Search Report, for application No. EP 01925106.5-2001/US0140173, mailed Jun. 3, 2005, 2 pages.

Excerpts from Texis Tutorial, URL http://www.thunderstone.com/texis/site/demos/map/, 9 pages.

Gaede, V., "Multidimensional Access Methods", ACM Computing Surveys, vol. 30, No. 2, Jun. 1998, pp. 170-231.

Guting R H: "An Introduction to Spatial Database Systems" VLDB Journal, vol. 3, No. 4, Oct. 1994, pp. 357-399.

Hill and Rasmussen, "Geographic Indexing Terms as Spatial Indicators", in *Studies in Multimedia: State-of-the-Art Solutions in Multimedia and Hypertext*, Stone, et al., (Eds.), Medford, NJ: Learned Information, pp. 9-20, 1992.

Hill, "Spatial Access to, and Display of, Global Change Data: Avenues for Libraries", Proceedings of the Data Processing Clinic Geographic Information Systems and Libraries: Patrons, Maps, and Spatial Information, pp. 125-150, 1995.

Hyland, et al., "GeoNODE: Visualizing News in Geospatial Context", Federal Data Mining Symposium and Exposition '99, AFCEA, Mar. 9-10, 1999, Washington, D.C., 12 pages.

International Search Report for International Patent Application No. PCT/US2007/013807 mailed Oct. 1, 2008, 8 pages.

International Search Report for PCT/US07/003769, mailed Aug. 2, 2007, 4 pages.

International Search Report from PCT/US2007/075266 mailed Jan. 14, 2008, 13 pages.

International Search Report from PCT/US2007/075289, Mailed Feb. 12, 2008, 4 pages.

International Search Report from PCT/US2007/075294, Mailed Feb. 6, 2008, 4 pages.

International Search Report issued for PCT/US2007/083238, dated May 21, 2008, 15 pages.

Internet Website: "http://www.ismap.com", home page; locate addresses and local services in Europe, pp. 1-2, Feb. 1, 2001.

Internet Website: http://mapsonus.switchboard.com/bin/maps-route, Show Route, pp. 1-3, Show Map, pp. 1-2, Jun. 14, 2001, 5 pages.

Internet Website: http://www.bbc.co.uk/h2g2/guide, The Hitchiker's Guide to the Galaxy, pp. 1-2, Jun. 14, 2001, 2 pages.

Internet Website: http://www.dogpile.com, homepage, pp. 1; Dogpile Local Search, pp. 1, Jun. 14, 2001, 2 pages.

Internet website: http://www.mapblast.com, home page, Jun. 14, 2001, 1 page.

Internet Website: http://www.mapplanet.com, home page, p. 1; Guided Tour—Introduction, p. 1; Guided Tour—Navigation, p. 1; Guided Tour—Claming a cell, p. 1; Guided Tour—Registration, p. 1; Guided Tour—Signing in, p. 1; Guided Tour—Searching, p. 1; Guided Tour—Technical Requirements, p. 1, Jun. 14, 2001, 8 pages.

Internet Website: http://www.northernlight.com, home page, pp. 1-2, 2000 Press Releases, Dec. 6; pp. 1-3, 2000 Press Releases, Jan. 19, pp. 1-3, 8 pages.

Korn, "A Taxonomy of Browsing Methods: Approaches to the Lost in Concept Space Problem", University of Maryland, Department of Computer Science, 1996, 27 pages.

Larson, "Geographic Information Retrieval and Spatial Browsing", in *Geographic Information Systems and Libraries: Patrons, Maps, and Spatial Information*, Papers presented at the 1995 Clinic on Library Applications of Data Processing, pp. 1, 81-123 (1995).

Larson, et al., "The Sequoia 2000 Electronic Repository," Digital Technical Journal, vol. 7(3), pp. 50-65 (1995).

Liu, et al., "A New Point Process Transition Density Model for Space-Time Event Prediction", IEEE Transactions on Systems, Man, and Cybernetics: Part C: Applications and Reviews, 34(3):310-324 (2004).

Liu, et al., "Criminal Incident Prediction Using a Point-Pattern-Based Density Model", International Journal of Forecasting, 19(4):603-622 (2003).

Mapquest, retrieved from the Internet: http://www.mapquest.com, retrieved Apr. 20, 2001, 9 pages.

MetaCarta, "A White Paper on MetaCarta's Technology and Products", XP002463193, 2005, 24 pages.

Nadeau, et al., "Unsupervised Named-Entity Recognition: Generating Gazetteers and Resolving Ambiguity", Published at the 19th Canadian Conference on Artificial Intelligence, Quebec City, Quebec, Canada Jun. 7, 2006, NRC 48727 (13 pages).

Ooi, B.C., "Indexing in Spatial Databases", http://www.comp.nus.edu.sg/-ooibc/papers.html, A Spatial Indexing Structures (long survey) 1993, pp. 1-71.

Open GIS Consortium, Request for Quotation and Call for Participation in the OGC Geospatial Fusion Services Testbed Phase 1, Jun. 2000, 93 pages.

Petras, et al., "Time Period Directories: A Metadata Infrastructure for Placing Events in Temporal and Geographic Context", Proceedings of the 6th ACM.IEEE-CS Joint Conference on Digital Libraries, Jun. 2006, pp. 151-160, XP002478581.

Plazanet, et al., "Experiments with Learning Techniques for Spatial Model Enrichment and Line Generalization,", Geoinformatica, 2(4):315-333 (1998).

Robertson, S.E. et al., "Simple, proven approaches to text retrieval", Technical Report, University of Cambrige, No. 356, May 1997, pp. 1-7.

Sekine and Isahara, "IREX Project Overview", Proceedings of LREC 2000: 2nd International Cofnerence on Language Resources & Evaluation, Athens (2000), 6 pages.

Sester et al., "Linking Objects of Different Spatial Data Sets by Integration and Aggregation", GeoInformatica 2:4, pp. 335-358 (1998).

Smith, T., "A Digital Library for Geographically Referenced Materials" IEEE Computer (1996), vol. 29, pp. 54-60.

Soffer, et al., "Integrating Symbolic Images into a Multimedia Database System using Classification and Abstraction Approaches", VLDB Journal, 7:253-274 (1998).

Su et al., "Morphological Models for the Collapse of Area Features in Digital Map Generalization", GeoInformatica 2:4, pp. 359-382 (1998).

Vilain, et al., "Exploiting Semantic Extraction for Spatiotemporal Indexing in GeoNODE", Published Apr. 2000, 9 pages.

Ware and Jones, "Conflict Reduction in Map Generalization Using Iterative Improvement", GeoInformatica 2:4, pp. 383-407 (1998).

Weibel and Jones, "Computational Perspectives on Map Generalization", GeoInformatica 2:4, pp. 307-314 (1998).

Woodruff, et al., "GIPSY: Georeferenced Information Processing SYstem", Computer Science Division University of California, Berkley and Library and Information Studies, University of California Berkley, pp. i-iii and 1-21 (1994).

Zeng, et al., "West Nile Virus and Botulism Portal: A Case Study in Infectious Disease Informatics", Lecture Notes in Computer Science: Intelligence and Security Informatics [Online], vol. 3037/2004, Aug. 24, 2004, pp. 28-41.

European Office action for corresponding EP application No. 06 774 239.5-2201 dated Feb. 23, 2011, pp. 1-16.

MetaCarta GTS Systems, MetaCarta, Feb. 6, 2005, web.archive.org/web/20050206162128/www.metacarta.com/products/gts/index.html, pp. 1-2.

Technology, MetaCarta, Feb. 6, 2005, web.archive.org/web/20050206071702/www.metacarta.com/technology/index.html, pp. 1-5.

* cited by examiner

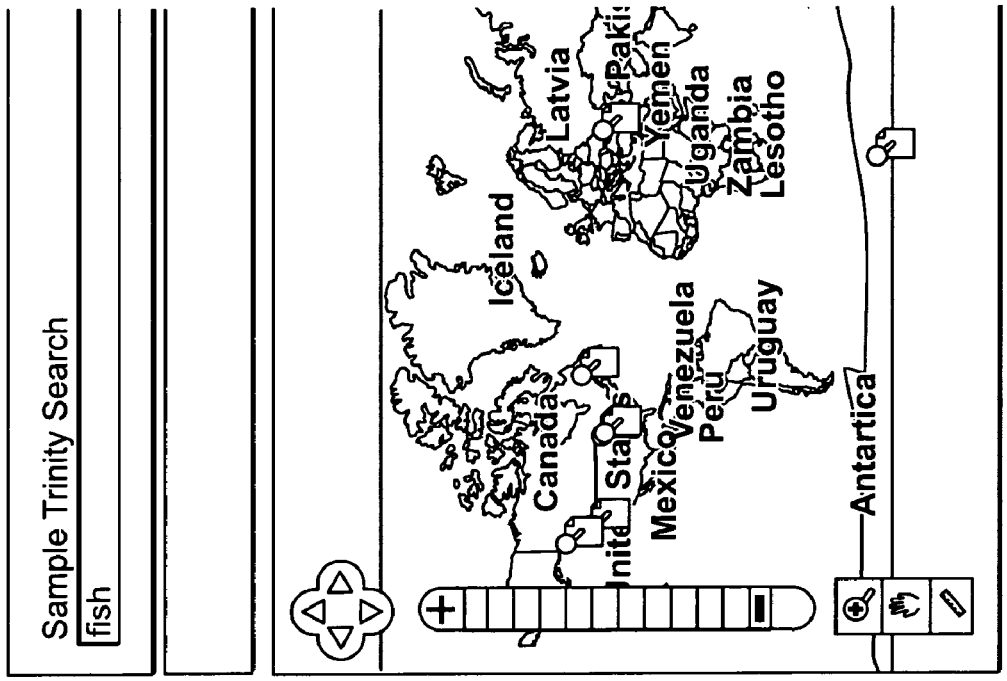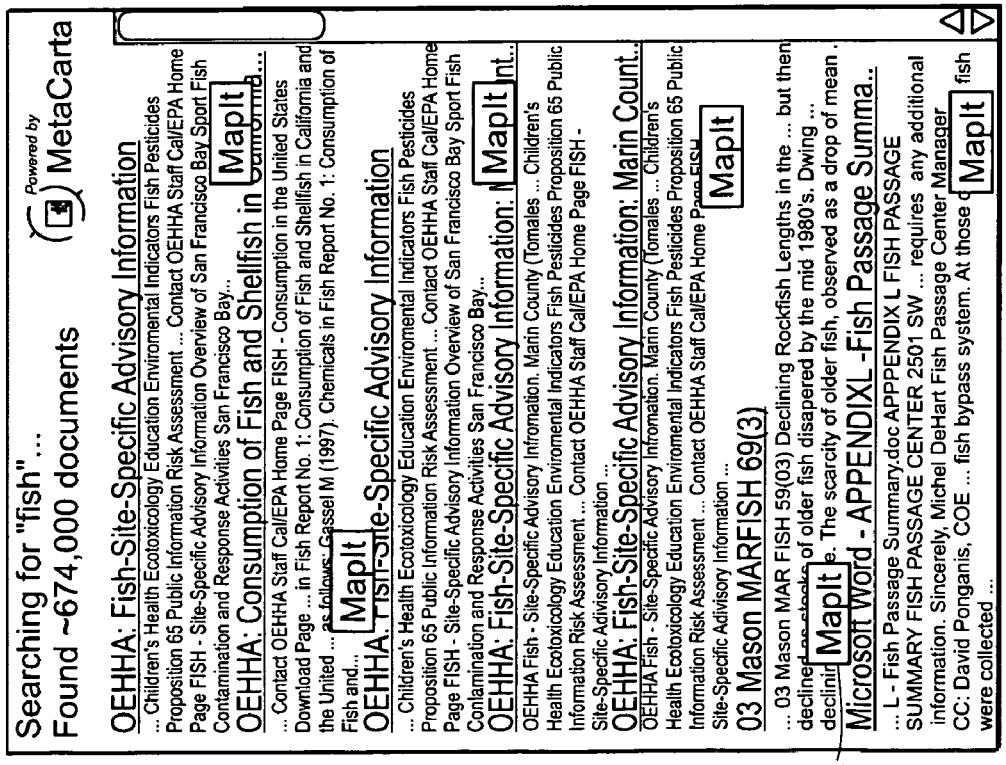
FIG. 2

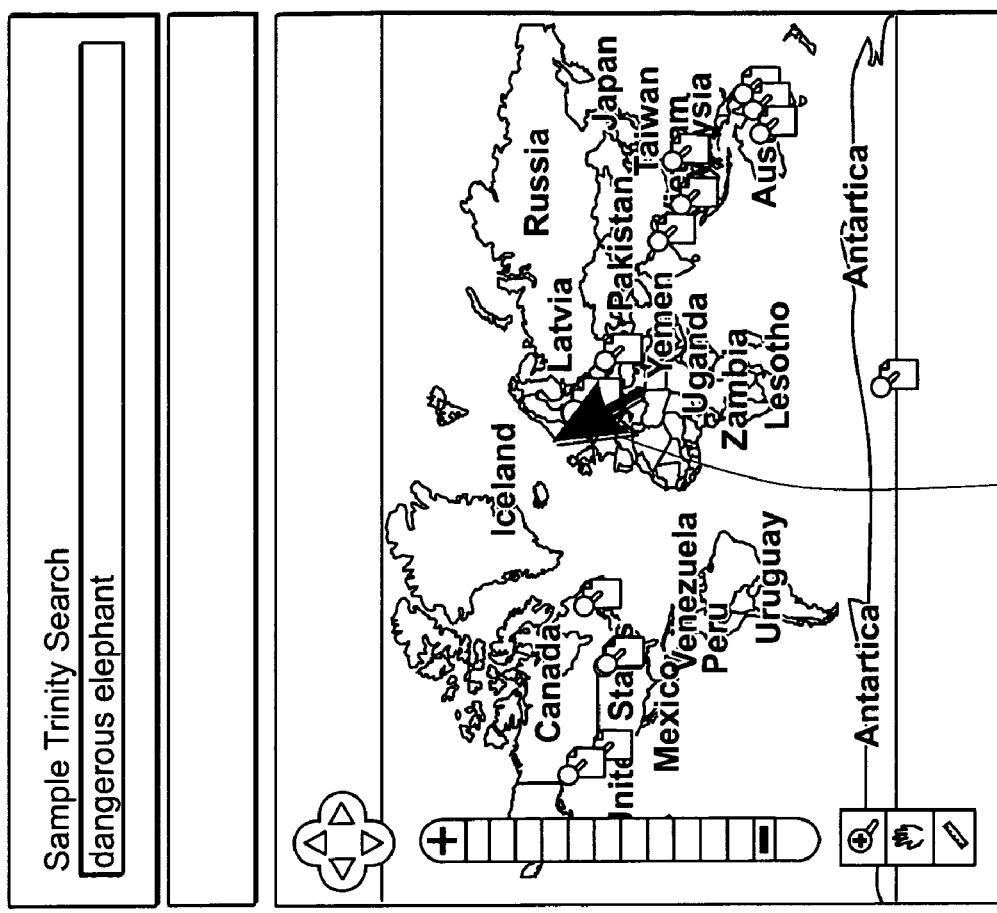
FIG. 7

Trekking down the coast

80 82

... documented his extensive travels in Oman ♦ ♀ ...
find water, he put his trust in Mohammed ♦ ♀ ...

FIG. 10

Terrorist Abu Musab al-Zarqawi died in 'safe house' rubble in Baghdad neighborhood of Aza. al-Zarquawi was betrayed from inside the al
84————[0.834] A  A—86 _88
Qaeda group that he led in the insurgency against coalition troops in

Iraq. "Tips and intelligence from Iraqi senior leaders from his network
[0.679] A  A
led U.S. forces to al-Zarqawi," U.S. Army Maj. gen. Bill Caldwell said
[0.679] A  A                                    [0.679] A  A
from his command in the Green Zone. Officials say a tape made by
                    [0.679] A       A
Abu Musab al-Zarqawi may have led to his undoing.

FIG. 11

Terrorist Abu Musab al-Zarqawi died in 'safe house' rubble in Baghdad neighborhood of Aza. al-Zarquawi was betrayed from inside the al Qaeda group that he led in the insurgency against coalition troops in Iraq. "Tips and intelligence from Iraqi senior leaders from his network led U.S. forces to al-Zarqawi," U.S. Army Maj. gen. Bill Caldwell said from his command in the Green Zone. Officials say a tape made by Abu Musab al-Zarqawi may have led to his undoing.

Terrorist Abu Musab al-Zarqawi died in 'safe house' rubble in Baghdad neighborhood of Aza. al-Zarquawi was betrayed from inside the al Qaeda group that he led in the insurgency against coalition troops in Iraq. "Tips and intelligence from Iraqi senior leaders from his network led U.S. forces to al-Zarqawi," U.S. Army Maj. gen. Bill Caldwell said from his command in the Green Zone. Officials say a tape made by Abu Musab al-Zarqawi may have led to his undoing.

1.0
1.0
0.679

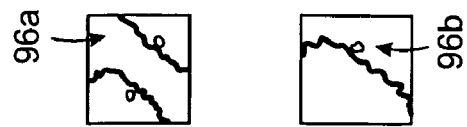
96a     96b

FIG. 13

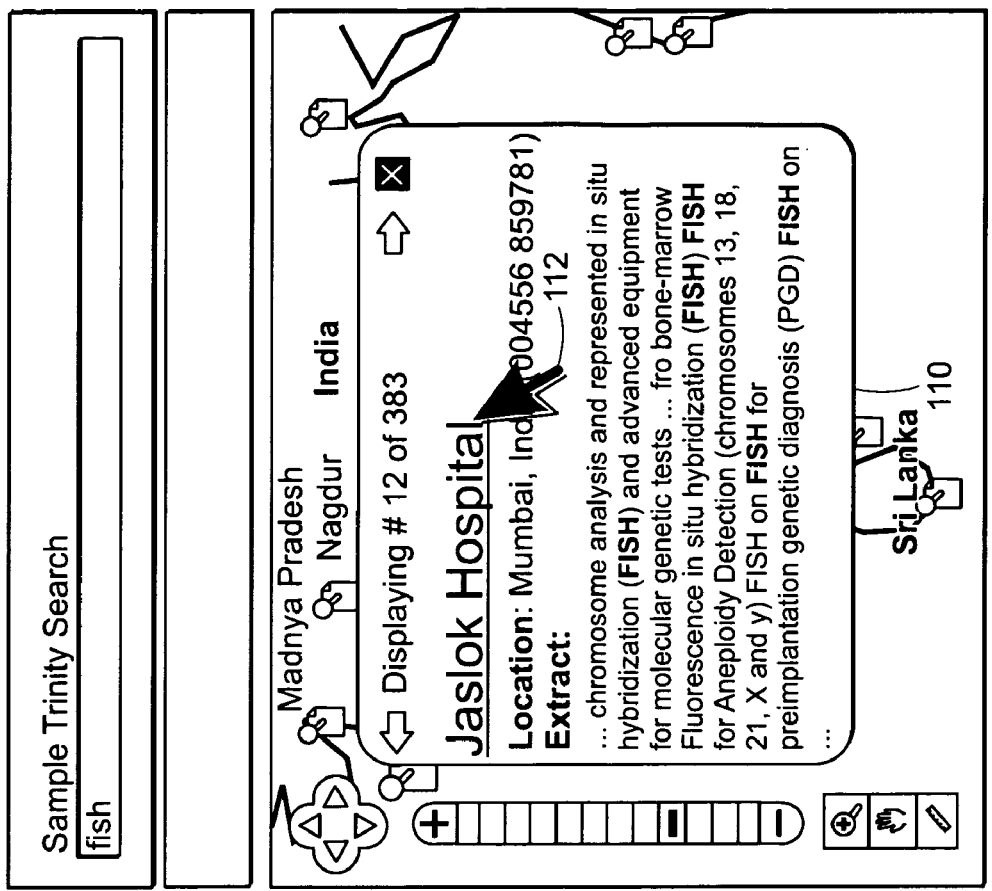
FIG. 15A

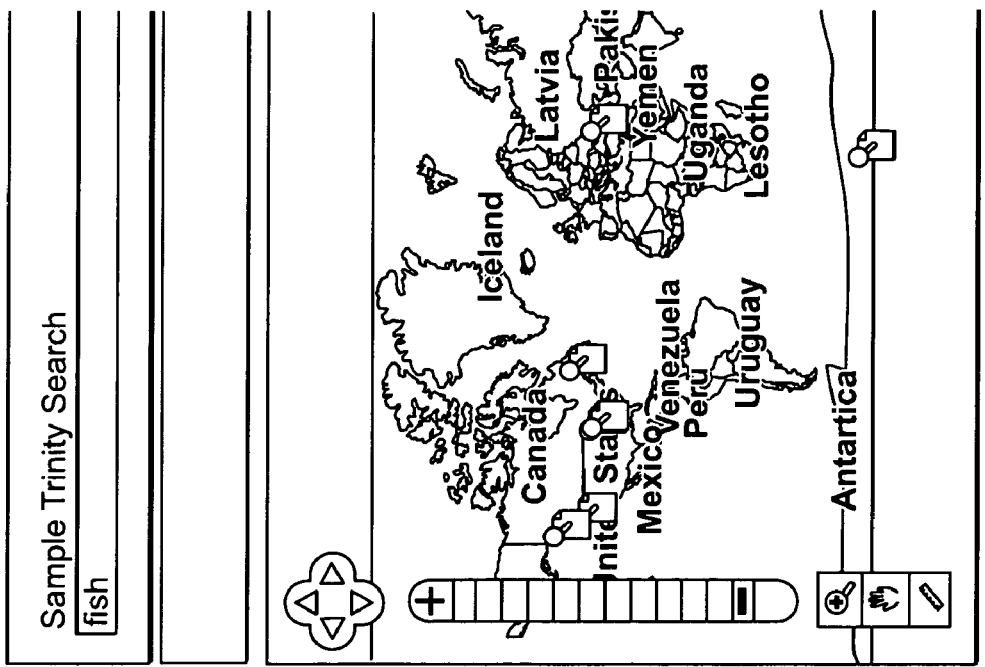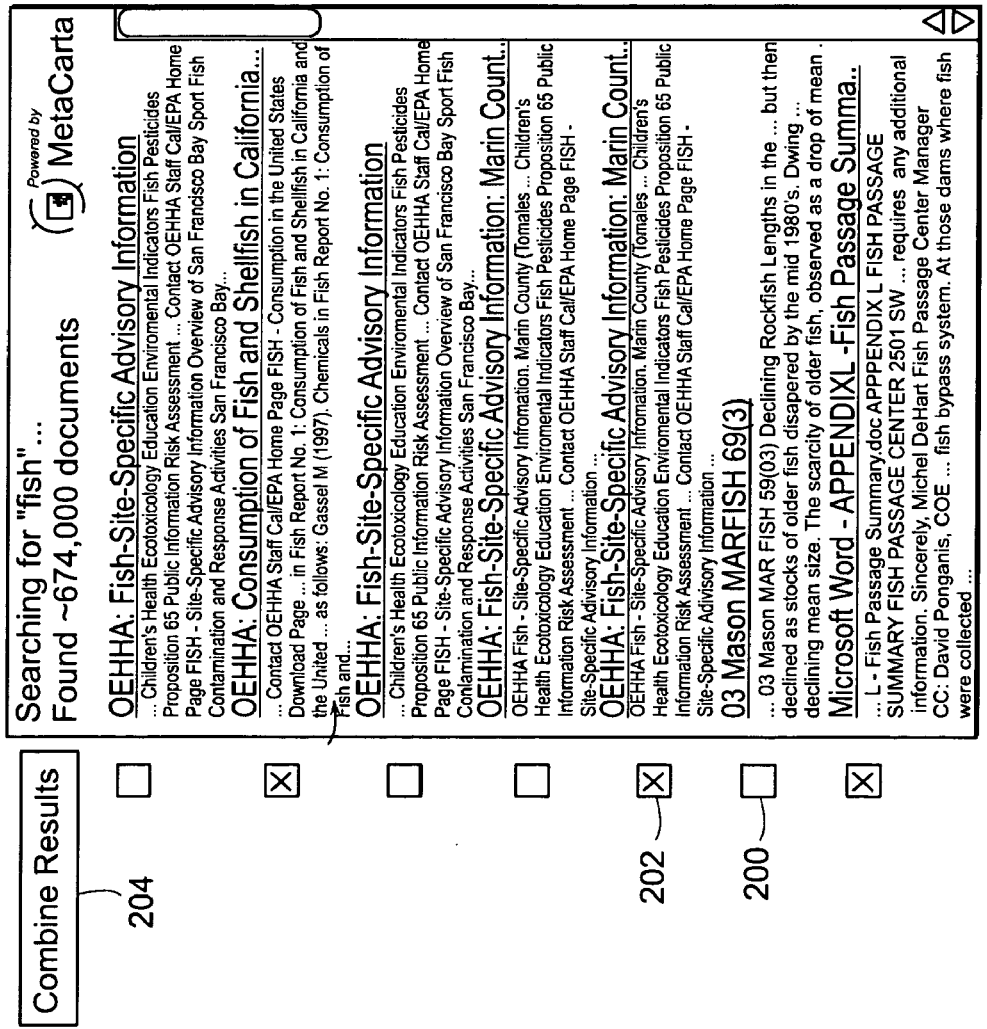
FIG. 16A

FIG. 16B

[Save] [Add more snippets] — 216, 214

210

OEHHA: Consumption of Fish and Shellfish in California and th... ...Contact OEHHA Staff Cal/EPA Home Page FISH Consumption in the United States Download Page ... in Fish Report No. 1: Consumption of Fish and Shellfish in California and the United ... as follows: Gassel M (1997). Chemicals in Fish Report No. 1: Consumption of Fish and...   [View Original]

OEHHA: Fish-Site-Specific Advisory Information: Marin County (Tomales... Children's Health Ecotoxicology Education Environmental Indicators Fish Pesticides Proposition 65 Public Information Risk Assessment ... Contact OEHHA Staff Cal/EPA Home Page FISH - Site-Specific Advisory Information: Marin County Announcement ...   [View Original]

Microsoft word - APPENDIX L_ Fish passage Summary.doc ...L - Fish Passage Summary.doc APPPENDIX L FISH PASSAGE SUMMARY FISH PASSAGE CENTER 2501 SW ... requires any additional information. Sincerely, Michele DeHart Fish Passage Center Manager CC: David Ponganis, COE ... fish bypass system. At those dams where fish crossed separators the fish were collected as ...   [View Original] — 214

212

USER INTERFACE FOR GEOGRAPHIC SEARCH

This application claims the benefit of U.S. Provisional Application No. 60/694,614, filed Jun. 29, 2005, incorporated herein by reference.

TECHNICAL FIELD

This invention relates generally to a user interface for a geographic search engine.

BACKGROUND OF THE INVENTION

There are many tools available for organizing and accessing documents through different interfaces that help users find information. Some of these tools allow users to search for documents matching specific criteria, such as containing specified keywords. Some of these tools present information about geographic regions or spatial domains, such as driving directions presented on a map.

An example of one of these tools is described in U.S. 2002/0078035 A1. That particular tool is a computer system that presents a map interface to a user and that interface enables a user, among other things, to pose a query via the map interface and to be able to inspect a representation of the query results arranged on the map as icons. The map and the icons are responsive to further user actions, including changes to the scope of the map, changes to the terms of the query, or closer examination of a subset of the results. The targets of the query are documents. Examples of documents include text-based computer files, as well as files that are partially text-based, files containing spatial information, and computer entities that can be accessed via a document-like interface. A spatial recognizer process examines documents for spatial information content. When the spatial recognizer determines that a document has spatial information content, the document is added to a spatial document collection. A document ranking process assigns a spatial relevance score to each document in the spatial document collection. The spatial relevance score is a measure of the degree to which the document relates to the spatial location mentioned in its spatial information content.

Such tools are available on private computer systems and are sometimes made available over public networks, such as the Internet. Users can use these tools to gather information.

SUMMARY OF THE INVENTION

In general, in one aspect, the invention features a computer-implemented method of processing a geotext query, the method involving: receiving a first free-text query string from a user; and decomposing the first free-text query into a non-geographic query and a geographic query, wherein the non-geographic query is a second free-text query string derived from the first free-text query string and the geographic query is a geographical location description.

Other embodiments include one or more of the following features. The method also involves using both of the non geographic query and the geographic query as a basis for conducting a search of documents that are responsive to the free-text query. It also my involve displaying the non geographic query and the geographic query to the user. Using both of the non-geographic query and the geographic query to conduct a search of documents that are responsive to the free-text query involves: submitting the non-geographic query to a text search engine to identify documents that are responsive thereto; and submitting the geographic query to a geographic search engine to find documents that are responsive thereto. Alternatively, using both of the non geographic query and the geographic query as a basis for conducting a search of documents that are responsive to the free-text query involves providing an interface that enables the user to refine the geographic query to produce a refined geographic query. The method also involves generating a confidence score for the geographic query, and wherein displaying the non-geographic query and the geographic query to the user involves displaying the confidence score for the geographic query. The method may also involve providing an interface to the user which enables the user to adjust the displayed confidence score.

In general, in another aspect, the invention features a computer-implemented method involving: receiving user input that selects a document; requesting from another service geotags for the selected document; displaying on a visual display device a map for the selected document; and marking the map with the geotags obtained from the service.

Other embodiments of that aspect include one or more of the following features. The other service is a geoparser. Requesting the geotags involves identifying the document to the geoparser, e.g. by sending the document to the geoparser. The method also involves: submitting a query to a search engine; receiving search results from the search engine, the search results being a list of documents that are responsive to the query, wherein the first-mentioned document is among the documents in the list of documents; displaying the search results via a visual interface that is displayed on visual display device; and presenting to the user a tool that is accessible through the visual interface which enables the user to select the document from among the search results. Presenting the tool that is accessible through the visual interface involves displaying a button on the visual interface which when selected by the user accesses the functionality of the tool.

In general, in still another aspect, the invention features a computer-implemented method of representing a plurality of documents on a map, wherein all of the plurality of documents refer to a particular geographical area. The method involves: displaying the map on a visual display; representing the plurality of documents by a single icon located at the particular geographical area on the map; in a region associated with the icon, displaying information about a selected one of the documents among the plurality of documents; and providing a navigational control which enables a user to page through the plurality of documents and successively display in said region information about each of the other documents among the plurality of documents represented by that icon.

Other embodiments include one or more of the following features. The region is a popup bubble. The method further involves, in response to receiving an input from the user selecting the icon, generating the popup bubble. The displayed information about each document is an extract from that document. The navigational control includes a first control for enabling the user to step forward through the plurality of documents and/or a second control for enabling the user to step backwards through the plurality of documents. The popup bubble also displays the number of documents within the plurality of documents and/or a number of the selected document.

In general, in still yet another aspect, the invention features a computer-implemented method of representing a plurality of documents that are responsive to a query, the method involving: displaying a map on a visual display; and displaying a plurality of icons on the map, said icons having a visual characteristic, each icon representing a set of one or more documents among the plurality of documents, each icon located at a corresponding geographical location on the map to which the documents of the corresponding set of documents refer and wherein the set of documents for each icon has associated therewith a measure of its relevance to the query; and adjusting the visual characteristic of each icon to reflect the relevance measure for the set of documents represented by that icon.

Other embodiments of that aspect of the invention include one or more of the following features. The visual characteristic is transparency. The icon with the highest measure of relevance is displayed with the least transparency; and the icon with the lowest measure of relevance is displayed with the highest transparency. Each document has a relevance score and the relevance measure that is used for each set of documents is the highest relevance score among the documents in that set.

In general, in another aspect, the invention features a computer-implemented method involving: receiving a query; in a first window pane of a displayed user interface, displaying a list of documents that are responsive to the query; in a second pane of the displayed user interface, displaying a map, the first and second panes displayed concurrently; within the map, displaying markers identifying geographical locations associated with the documents among the list of documents; and in response to the user selecting one of the documents identified in the displayed list of documents, highlighting a subset of the plurality of markers that correspond to that selected document.

Other embodiments include one or more of the following features. Highlighting involves changing the size of the corresponding marker. e.g. making the corresponding marker larger.

In general, in yet still another aspect, the invention features a computer-implemented method involving: receiving a query; in a first window pane of a displayed user interface, displaying a list of documents that are responsive to the query; in a second pane of the displayed user interface, displaying a map, the first and second panes displayed concurrently; within the map, displaying markers identifying geographical locations on the map that are associated with each of the documents among the list of documents; and in response to the user selecting one of the markers displayed on the map, highlighting among the list of documents a subset of those documents that correspond to that selected marker.

Other embodiments include one or more of the following features. Highlighting involves applying a shading for at least a portion of the corresponding one or more entries on the list of documents. The shading is a background color.

In general, in still yet a further aspect, the invention features a computer-implemented method involving: using a geoparser engine to tag a document with a plurality of tags; on visual display, displaying at least portions of the document to a user with the tags associated with those portions; providing an interface that enables the user to change any of the displayed tags among the plurality of tags; and sending any changes made to the plurality of tags by the user back to the geoparser engine to modify the performance of the geoparser engine.

Other embodiments include one or more of the following features. The plurality of tags includes a plurality of labels presenting relevance scores and a plurality of text markers. The enabled change includes deletion, and/or extending or reducing a range of characters; and/or changing a confidence score; and/or changing a location to which the tag refers; and/or improving precision of a location definition.

In general, in still yet a further aspect, the invention features a computer-implemented method involving: submitting a geotext query to a search engine; receiving search results from the search engine, the search results including a document that is responsive to the geotext query; displaying a map on a visual display device; displaying a marker on the map that corresponds to the document and is located at a geographical location on the map to which the document refers, wherein the marker presents information about the document; and enabling a user to select at least some of that information from the marker and generate a tag that is associated with that geographical location irrespective of whether any markers shown on the displayed map.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2 is a screen shot of the results list area showing the "Map It" button.
FIG. 7 shows an example of result list visual highlighting.
FIG. 10 shows visual elements in the interface that allow the user to approve or disapprove a geographic reference.
FIG. 11 shows visual elements that allow the user to see the confidence of a geographic interpretation and to adjust the character range.
FIG. 12 shows a change in state of the system from that shown in FIG. 11.
FIG. 13 shows examples of interface-generated map images of the locations referenced in the text.
FIGS. 15A-B illustrate how the interface enables the user to generate an annotation on a map.
FIGS. 16A-B illustrate how the GUI enables the user to combine results from various identified documents to generate a new document.

DETAILED DESCRIPTION

Figure 1:
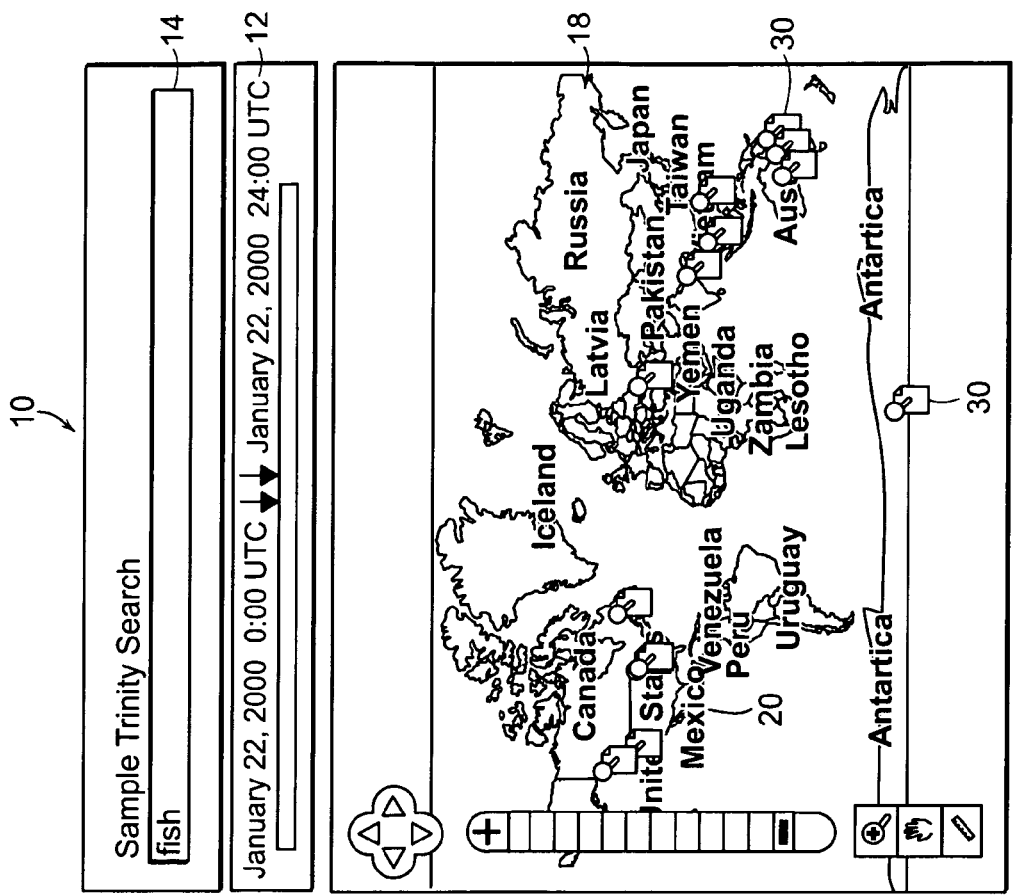
FIG. 1 is a screen shot of the user interface.
Figure 3:
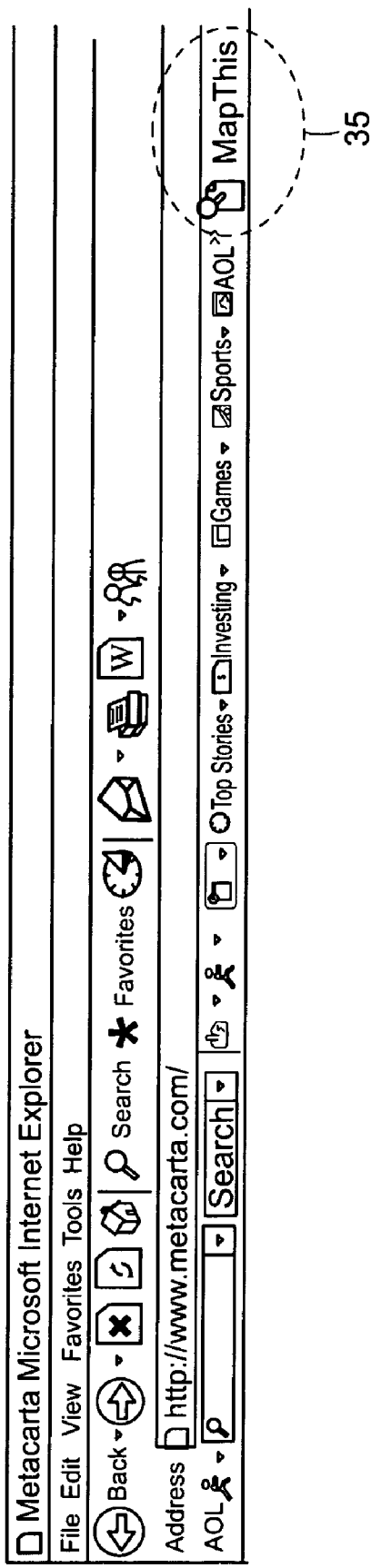
FIG. 3 is a toolbar including a "MapThis" (aka MapIt") button.

We describe a graphical user interface (GUI) for a software system that allows users to find and visualize information about geographic locations. The GUI helps the user see large amounts of information rapidly. In particular, the GUI displays relevance ranked geographic data from a variety of sources, including Geographic Text Search (GTS) systems described in our earlier filings (e.g. see US 2002/0078035 published Jun. 20, 2002). Relevance ranked data is information that has been automatically sorted by the software system according to user input. Relevance ranking is a type of "artificial intelligence" that attempts to select information of greater interest to the user by analyzing input from the user.

Typically, user input is quite small compared to the information being sorted, so we mitigate this imbalance with a variety of techniques for accepting user input and for presenting feedback to the user.

The GUI consists of three "areas" or "window panes" inside a web browser window, such as Mozilla Firefox or Microsoft Internet Explorer:
1. a search input area 10 with a time range indicator 12 and a search string input field 14;
2. a results list area 16; and
3. a map display area 18 which displays a map 20 with icons at geographical locations referred to in the documents listed in results list area 16.

All three areas accept user input in various ways. We describe their individual behaviors first, and then describe the interactions between the three.

Throughout this document we refer to "relevance ranked" search results from "document" search engines. By document, we mean any digital data record containing possibly structured and unstructured data elements in any format. By relevance ranked, we mean an ordering applied to a set of document references in response to a user query for information contained in the documents. A "relevance function" is a mathematical function that computes a number indicating the degree of pertinence or strength of match between a document and user interest as expressed by a query.

Search Input Area

The GUI includes a geographic map 20 and a time range indicator 12 that allow the user to select a geographic area or areas of interest and time frame(s) of interest. These inputs can limit search results to only those documents containing references to specified time frames and map areas.

The Search Input Area allows the user to type questions into a single form field 14. The community of academic research focused on natural language "question answering" attempts to heuristically analyze and decompose such user input into structured database queries that can answer the user's question. Regardless of the quality and efficacy of such heuristic decomposition, it is useful to show the user how the system decomposed their query. If multiple decompositions are possible, it is useful to show the user multiple decompositions and allow them to choose those that best reflect their intentions.

We call this disambiguation process Query GeoParsing. The essential features of any Query GeoParsing process are the form of the input and output:

The input to a Query GeoParser includes an unstructured free-text string and possibly other facts about the circumstances of its input, such as who typed it and where they are located.

The output of a Query GeoParser includes two parts:
1. A free-text query string derived from the input string
2. A structured geographic location description, such as a pair of latitude, longitude coordinates or a polygon to view in a map Either part of the output could be empty. For example, if the input string is simply the word letters "Baghdad" then the output would typically be an empty Part 1 and a coordinates for one of the places in the world called "Baghdad," such as Baghdad, Iraq.

A good Query GeoParser generates confidence scores indicating the probability that the user really intended this interpreted meaning when they typed their query.

The described embodiment shows the user geographic and temporal interpretations of their query, and allows them to adjust the interpretations used by the system. This allows the user to refine their query to more accurately and precisely represent their intentions. This essentially replaces the notion of natural language question answering with interactive query refinement. Instead of only allowing the user to ask the system questions, this system also poses questions to the user.

For example, if the user enters "reports of nuclear weapons in iran during the 1990s," the GUI immediately launches a query for all of the input words and uses the presently selected map area(s) and time range(s) as additional constraints on the query. This generates results using the possibly geographic or temporal words simply as unstructured free-text words. In parallel with presenting results to this query, the GUI also poses questions to the user. For this example, the GUI might present text saying something like any of the following:

Did you mean to limit your search to the area near Iran or inside Iran?

Did you mean to limit your search to the timeframe after "Jan. 1, 1990" and before "Dec. 31, 1999"?

Did you mean to search for the words "reports of nuclear weapons" in the country of Iran?

Did you mean to search for documents with the words "reports of nuclear weapons" and references to places in the country of Iran and times during the time range 1990-1999?

If the user clicks any of the bold-underlined links in these questions, then the map or time range indicators respond by adjusting to indicate that constraint. This allows the user to quickly ask a question and then iteratively refine it with the help of the questions posed by the system.

Another novel feature of the described embodiment is that it behaves differently when there are less ambiguous interpretations of the user's geographic input. If the system recognizes part of the user's input as being very likely geographic, then it offers a link that indicates such higher certainty by presenting the fully resolved location name. Further, when the user clicks this link, it zooms the map directly to this location. A fully resolved location name includes the hierarchically enclosing political regions, e.g. "Catkoy, Yozgat, Turkey" is fully resolved and "catkoy" is not. This is possible because the system is analyzing the user's query to decide which input words are intended to be geographic and which are not. Since this analysis generates probability confidence scores, the magnitude of the confidence allows the system to behave differently when the user's query is more or less geographically ambiguous. If the user says "catkoy" and the system has a relatively low confidence, such as 0.3, then the system can present a question reflecting this uncertainty, like "Did you mean a place called Catkoy? There is such a place in Turkey." If the user clicks this link, the system can present the user with a list of locations with that name.

On the other hand, if the user's query was the less ambiguous "tree parks in Catkoy, Turkey" the system could skip the question step altogether and immediately zoom the map to that part of Turkey and do a query for "tree parks."

The GUI also presents statistics to the user about the number of various types of data objects available. In particular, the GUI presents:

The number of documents available in the system

The number of documents matching their non geographic query constraints

The number of locations being viewed and the number of documents that contributed these location references—a single document can refer to multiple locations The number of activated results—see "waterline" discussion below Results List Area Results List Area 16 displays a variety of lists generated from various information sources. Some of these lists are "metric sorted lists," i.e. the items in the list are presented in increasing or decreasing order according to a property of the list elements that is comparable via one-dimensional metric comparisons, which are isomorphic to greater-than-or-equal-to comparisons of integers. A commonly used class of metrics for such comparisons is automatically computed relevance scoring metrics, which estimate the pertinence of a list item to a user's interests as expressed through the user's query.

When presenting lists of document search results, a commonly used GUI technique is to present a hyperlink to the document and to also present short strings of text extracted from the document. These strings of words are called "extract texts" and often are presented with bold font or color highlighting of query words input by the user. Additional common GUI techniques include presenting a link to a cached or backup copy of the document and presenting a link to similar documents. We call these commonly presentation techniques "basic result information."

Other sources of information include structured databases whose data records are often not called "documents." We call them documents here because most data records contain some fields or elements that are unstructured and require either human, heuristic, or statistical assessment to be used. Thus, all data objects of any kind are called "documents." Regardless of the source of a document, it may contain geographic information either implicitly or explicitly. Documents with explicitly labeled latitude/longitude fields can be plotted on a map without further analysis. Documents with varchar fields, strings of text, audio recordings, video, or other arrangements of bytes may be found to contain geographic information that was previously only implicit in the bytes. For example, an audio recording of a speaker describing a famous civil war battle has several implicit geographic references. The location of the speaker might be deduced by recognizing the speech as "President Lincoln's Gettysburg Address" and using another database source to associate that title with the file and further using yet another database to associate coordinates with Gettysburg. Further, the words in the audio might mention the names of villages, and by associating coordinates with these names, a geographic analyzer can associate additional coordinates with the audio file.

From this perspective, all documents are potentially geographic. Since essentially all recordings are created at a particular moment in space and time, at the very least, that location of creation gives every document geographic meaning. Thus, everything is geographic. The described embodiment exposes the geographic meaning of documents provided from any source.

Map this Document

In the described embodiment, the GUI presents a new type of button in the document search results. Since the results may have come from a search engine that does not provide geographic information about the documents, the user typically cannot tell whether a given document will be pertinent to their geographic interests. To assess such relevance, the user would typically need to open the document and read its contents looking for geographic references within their map view. Even after the user has loaded the document for viewing, it may contain geographic references to places unfamiliar to the user. Referring to FIG. 2, a "Map This Document" button 22 fixes this problem. We also refer to this button as the "MapIt" button or the "ArticleMapper button," and we call the display that generates an "ArticleMapper GUI."

The purpose of an ArticleMapper GUI is to show the user information about one document. In particular, the ArticleMapper GUI shows geographic information that has been automatically extracted from the document.

Various Modes of Performing "Map this Document"

As described in U.S.2002/0078035 published Jun. 20, 2002 and incorporated herein by reference, a document might refer to multiple locations and the geographic text search interface can display a plurality of markers to represent this. If a user constructs a search that retrieves only one document, for example by using the "url:" operator that limits the results to only show information from the document with that URL, then all the markers in the map will be from that one document.

We have found that several related embodiments of this original idea are also useful. These different embodiments all contain the same essential three elements and differ only in their mode of interacting with the GeoParsing engine. The essential elements are:

1. Some user behavior selects a document that a user wants to view
2. Automatically extracting geographic information from the document using a GeoParsing engine like the one inside of MetaCarta's GTS Product or GeoTagger Product. Some systems may cache the results of this extraction process in a database for future reference. When a subsequent action requests the tags for the same document, the system can use the cached copy instead of using the GeoParsing engine again. If a user provides corrections to the tags, these may also be stored in the database and provided to subsequent requestors instead of the original automatically produced tags.
3. Displaying that geographic information to the user along with text from the document.

The basic implementation of these three pieces along with modifications thereof are described below.

A "Map this Document" Function in the GTS GUI

Referring again to FIG. 1, the GTS shows the user markers 30 in a map corresponding to documents that are both responsive to a free-text query input by the user and also refer to the locations represented by the markers in the map, also known as a domain identifier. When a document refers to multiple locations, the GTS GUI can display more than one of the markers for that one document. These document-location tuples are defined by a range of characters in the document containing a string that the GeoParser has interpreted as referring to that location with some confidence. The character range, location coordinates, and confidence score are sufficient information for the GUI to plot a marker and show some words from the document relevant to that location reference. The relevant text might be the window of characters surrounding the georeference or a collection of snippets containing the user's query words, or a combination of both.

When a result set contains a single document, this obviously leads to a display where all the markers are from the same document. As is standard in the art of information retrieval, we implemented a query "operator" that allows the user to issue commands through the query box. Typical operators are "site:" and "lang:" which limit the results to a particular host site or language input after the colon symbol in the operator. We created an operator for limiting results to only one document "url:insert document's URL here". The user could achieve this same result using any query that uniquely selected that document.

In this original embodiment, the three essential elements are implemented by aspects of the GTS system:
1. The document that the user wants to view is selected by the search query.
2. The automatic extraction of geographic information is performed by the GeoParser engine inside the GTS.

3. The display of geographic information and text from the document is performed by the GTS GUI.

Based on these capabilities, we have produced several other embodiments that we describe here.

Generating a Superimposed Map Via the ArticleMapper Toolbar Button

In this embodiment, we have included ArticleMapper software by means of which a user selects a document by viewing a document in a document viewer, like a web browser, and pushing a button in the viewer toolbar to cause steps (2) and (3) to be performed. We put the word "MapThis" (or "MapIt") in a toolbar button 35. When the user pushes the "MapIt" button, software in the viewer opens a connection to a GeoParser server over the network and sends the text of the document over the connection. The server responds with locations that it has extracted from that document. The software in the viewer then displays a map in a popup window above the document. The map shows markers on the locations extracted from the document. The user can move the popup around and expand or close it. The map popup is superimposed on top of the document window, so that the original document display is unaltered.

Typically, the ArticleMapper software in the viewer will highlight the words in the document display that the GeoParser interpreted as being geographic locations. When the user holds the pointer over a marker, the corresponding text references change visually to indicate that they caused that marker to appear, and vice versa: holding the pointer over a text reference causes the corresponding map marker to change visually.

Adding MapIt Buttons to a List of Search Results

When a user reads through a list of search results from a regular search engine, some of the documents may be geographic. It is useful to present a separate "MapIt" button 22 next to each of these results, as shown in FIG. 2. When the user clicks one of these buttons, it performs the same steps as the ArticleMapper Toolbar Button described above, and presents the user with a view of the document and a popup showing a map of locations extracted from the document.

Generating an Integrated Map

In this embodiment, a user selects a document simply by navigating to it using a document viewer, such as a web browser. The software that provides the document to the viewer performs steps (2) and (3) automatically without waiting for a separate request from the user. By extracting geographic locations and generating a map display before sending the document to the viewer, this embodiment has the advantage that the map can be displayed alongside the text of the document in an integrated layout. This is useful for collections of documents that frequently contain geographic references, because the map can be laid out in a standard template for presenting documents from the collection.

Dynamically Offer to MapIt if Relevant and Confident Enough

In any embodiment of "map this document," it is useful to define confidence and relevance cutoffs. If the geographic references found in the document are either not confident enough or not relevant enough, then the third step of displaying the map can be skipped to avoid showing the user irrelevant or wrong information. Confidence is a numerical parameter that indicates the probability that the author of the text really intended this particular location. Relevance is a numerical parameter that indicates the probability that this geographic reference is important or pertinent to the primary thrust or purpose of the document (e.g. see U.S. Ser. No. 60/812,865 filed Jun. 12, 2006, incorporated herein by reference).

Typically, factory default values for the confidence and relevance cutoffs are defined. Some GUIs may allow the user to adjust these cutoffs.

The ArticleMapper toolbar button can automatically check whether a document has locations with relevance and confidence above the cutoff. If not, the software can cause the button to disappear or change to a deactivated appearance, such as greyed out. For a system generating an integrated ArticleMapper map, the process of performing step (2) provides relevance and confidence parameters. If none of the locations pass the cutoffs, then no markers are plotted in step (3). Some systems may decide not to display a map if no markers are to be plotted.

When viewing a list of search results, it is often useful to dynamically assess which documents should have a MapIt button and which should not. These buttons allow the user to see which documents are interestingly geographic even if the search engine providing the results does not provide explicit geographic information with the results. The button is "smart" in the sense that it dynamically assesses whether the documents are geographically relevant and displays the result of this assessment to the user by presenting the MapIt button or not. The user can choose to map the results by clicking any of these buttons. We describe three implementations of this concept:

1) javascript code running in the user's browser can receive a document identifier or set of document identifiers ("docIDs") such as URLs and while displaying basic result information, the javascript code issues queries to a geographic database, such as the MetaCarta GTS, where the query contains the docIDs. If the GTS responds that it has already analyzed a particular document identified by one of the docIDs and found it to contain geographic information, then the javascript code activates the display of a "map this document" link or "MapIt" button along side the basic result information.

2) If the GTS responds that it has analyzed an identified documents and found it to refer to the particular map view with a particular relevance, then the javascript code further presents this relevance information alongside the "map this document" link.

3) If the GTS responds that it has not yet analyzed an identified document, then the javascript code presents a button saying "analyze this document for geography," which, if clicked by the user, will cause the javascript to ask the GTS to fetch the document, analyze it, and respond with an assessment of the documents geography. Or the system can request that the GTS perform the analysis on the fly.

Relevance Gradations in ArticleMapper Markers

When presenting map markers in an ArticleMapper GUI, it is often useful to change the markers to reflect the relevance and confidence of the location references in the text. In our original filing (see, U.S.2002/0078035 published Jun. 20, 2002), we indicated this information using numbers in the yellow markers. Another embodiment of this same idea is changing transparency of the markers. By making less relevant markers more transparent, they visually fade into the backdrop map and appropriately attract less attention from the user. (See FIG. 2 and the description in the section below entitled "Ghosting".)

User-Selectable Page Fold

Due to the large volumes of information being queried, lists in the results area could be extremely long. Commonly used GUI techniques allow the user to view additional pages of results, where each page contains a pre-determined number of results, such as 10 more. This is commonly indicated by a "next results" button or link, or by a number indicating a numbering of the results page. When the user clicks on such a "advance page number" or "next" button, the GUI refreshes with a new batch of results. In this commonly used GUI technique, the batches of results are of fixed maximum batch size, which the user can adjust only by entering a batch size in a configuration menu, which is separate from the next button and also fails to let the user indicate their screen size.

The user's screen size and willingness to scroll down on the screen are crucial factors in selecting the batch size. In the described embodiment, the user is enabled to choose the batch size dynamically through the same interface element that triggers the loading of additional results. This essentially replaces the notion of a next batch of results with a dynamic list length that the user can adjust. By combining the list length selection with the request to see more items in the list, the user is able to adjust the list length to match the height of their viewing window. We call this feature "the waterline" or "user-selectable page fold," because the bottom of the viewing window is typically called "the page fold." Like a physical fold in a real sheet of paper, the user must take physical action to view information presented below the fold.

Figure 4A:
FIGS. 4A-B show the user-selectable page fold (or waterlevel) in the results display area.
Figure 4B:
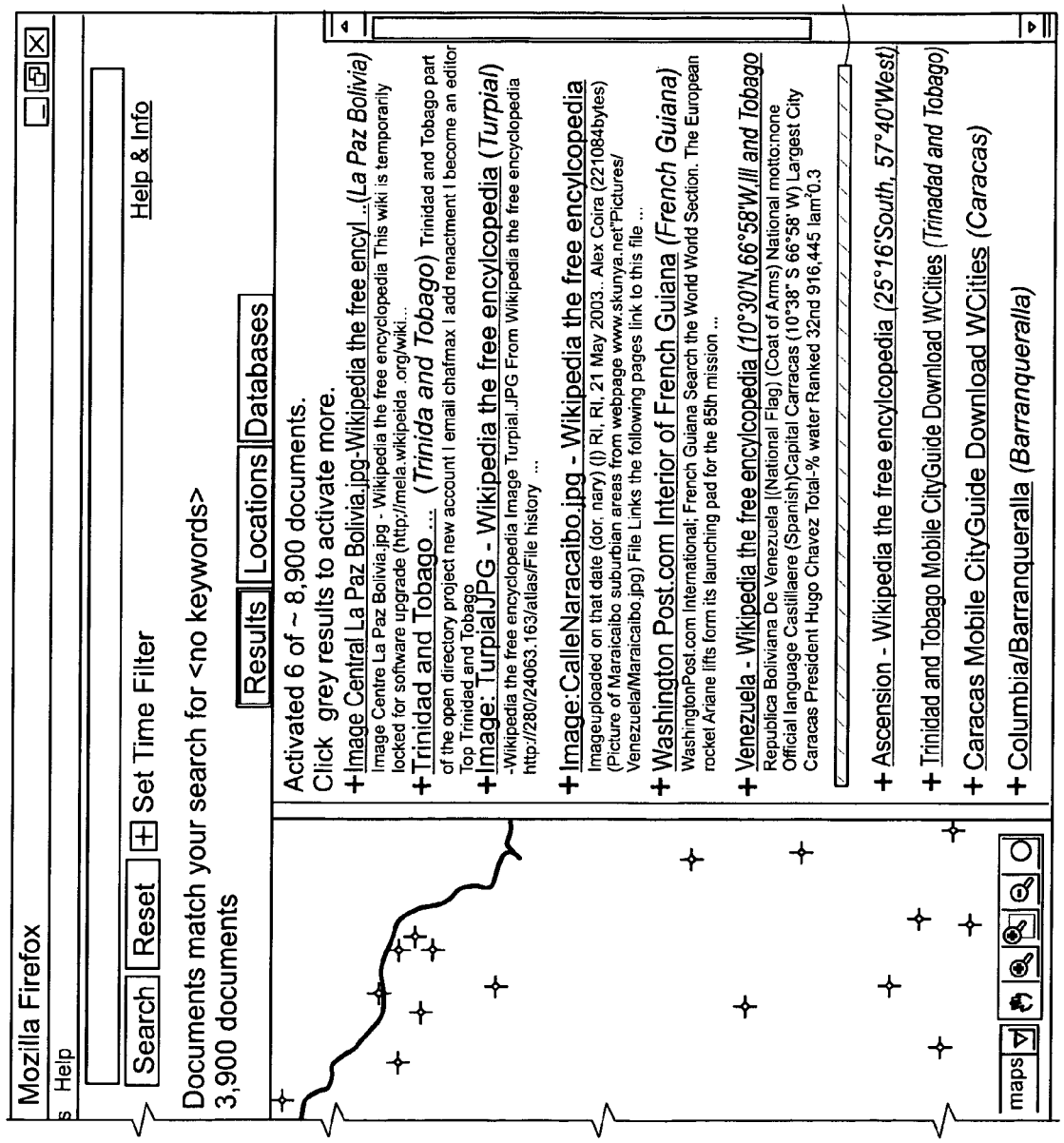

In the two screenshots in FIGS. 4A and B, the list area shows a set of regular results hyperlink and extract text for each document. Below these regular results are a few deactivated results that correspond to grey markers in the map. The dividing line between these two sets of results is indicated by annotation number 40. These are the next few results in the relevance ranked list. By clicking on any of these next few results, the user causes the dividing line between the regular and deactivated results to change. As indicated by figure annotation marker 42, the same list of results is displayed with this dividing line lowered. The results that have been expanded into regular results now have different markers in the map which shows they have been activated. This process can continue until the user has loaded all the results matching their query.

In other GUIs developed to present geographic document search results, a "view next batch of results" button is often presented to the user. This allows the user to view a new map annotation layer generated from search results of lower relevance than the previous batch. The document-location tuples in the search results can be numbered relative to each other using integers. These integer rank numbers allow the interface to request "batches" of results. The interface can request the next N lower ranked results. Nothing else about the user's query would change, only the minimum and maximum rank of the documents used to generate the labels. This is a logical distortion, because it creates multiple different map layers for the same user query where the only distinction is a nongeographic distinction. The database queries differ by the change of min/max rank, however the parameters input by the user to indicate their questions and interests have not changed. Designers felt that this distortion was necessary, because if all the results were presented, a clutter of symbols would obscure the map, and the time required to download the information to the user's display could become too long to be useful. Designers conceived of separate batches to limit the number of results presented.

The described embodiment solves this problem in a new way: a control element in the GUI allows the user to expand the list of results dynamically, i.e. instead of having a new batch to replace a first batch, there is only one batch and the user is permitted to dynamically increase the length of the result set. This allows the GUI to maintain geographic invariance. By combining all the batches into one layer, the distortion is eliminated. By making the map annotation layer more sophisticated, the GUI enables the user to adjust the degree of cluttering.

As shown in FIGS. 4A and B, the GUI shows the user a list of search results with a red-colored bar dividing the list into upper and lower lists. This bar defines the "waterlevel." Results above the line are activated and show more information about the database record. Results below the line are deactivated and grey-colored. Clicking on activated results allows the user to see the document. Holding the pointer above an activated result also causes corresponding map markers to bulge momentarily, allowing the user to see locations in the map that are referenced in that document.

Clicking on a result below the waterline causes the waterline to move down below that result. This allows the user to lower the waterline.

Other variations on the waterlevel implementation include using a slider bar or other input mechanism to allow the user to select a number of results to allow above the waterline. Another variation allows the user to select a relevance threshold instead of an absolute number of results. Such a relevance threshold can be visualized in the map as plane of "clouds" parallel to the map at an "altitude" above the map. When a result is higher relevance, it is displayed as though it is above these clouds. And when a result is lower relevance than the threshold, it is displayed as though obscured by the clouds. This variation is related to the subsection titled "Ghosting" below.

This feature allows the GUI to initialize the initial view of the Results List Area such that it always fits above the fold, and nonetheless permits the user to adjust the interface to show as many results as they wish. This feature works with any list, whether relevance sorted, or sorted by another metric, or not sorted.

Map Display Area

The Map Display Area has many aspects in common with traditional Geographic Information System (GIS) or mapping displays. It presents geographic maps at various scales and extents, from high-scale representations of building layouts or equipment networks to low-scale representations of entire countries or continents. Common GUI tools include click-and-drag rectangle tools for selecting sub-regions of the present display, clickable scale bar which changes the map scale in response to user input, and layer selector for choosing which layers of information to present in the map.

The described embodiment includes several novel features for presenting layers of information generated from relevance-sorted lists of results, such as those generated by document search engines. The GUI presents labels on the map generated from information extracted from the document results. The labels can contain text, images, and possibly other media extracted from the documents. These labels or annotations are automatically generated from the document search results.

Useful historical context for understanding these novel features is the notion of geographic invariance, which we adapt from the art of cartography. When presenting information about our approximately spherical planet on flat visual displays, such as computer screens and pieces of paper, cartographers must choose what distortions to tolerate and what distortions to minimize. Projecting the non-Euclidean geometry of a curved object, such as the Earth, onto a Euclidean space, such as a flat piece of paper, geometric distortion will unavoidably occur.

A commonly known example of this issue is the tradeoff between equal angles and equal areas. The mathematical function used to convert from spherical latitude-longitude coordinates to Cartesian coordinates of the plane could be chosen to be conformal, i.e. preserve angles, or not. If it is conformal, then the angle between intersecting lines will be the same in both the spherical and Cartesian geometries and the area of polygons will not be equal. Alternatively, an equalarea projection will preserve areas of polygons and will cause angles to differ between the two representations.

Analogous distortion issues arise when presenting labels generated from relevance-ranked document search results. The distortions are only analogous, because instead of being defined in simple geometric terms, these distortions are logical. The following subsections describe novel methods of resolving these distortions.

An example of such logical distortion can occur when the user pans the map. If pixel-area aggregation is used to cluster document result symbols, then changing the spatial extent that constrains the query can cause different symbols to appear in the map. Consider three queries:

1. Query One for lat/lon extent A
2. Query Two for lat/lon extent B
3. Query Three for lat/lon extent A+B A and B are contiguous spatial extents. Given the same query and minimum relevance constraints for all three queries, the document result set for 1+2=3. That is, the list of database tuples returned for Query Three will be exactly equal to combining the results returned for the separate Queries One and Two. The presentation of these results in the map need not have the same property. If the visual presentation of Queries One and Two displayed side-by-side is not exactly equal to the visual presentation of Query Three, then we say that the display is not geographically invariant. Achieving such geographically invariant visual presentation without overwhelming the user with cluttered information is quite challenging. As a result, many designers resort to clustering the map symbols, which breaks the geographic invariance. We present several alternatives that preserve geographic invariance and allow the user to adjust the degree of clutter in the display.

Ghosting

One source of user confusion in previous designs arises when the number of highly relevant results is larger than the first batch. In addition to the waterline, the GUI distinguishes between different levels of relevance by showing different symbols in the map. Higher relevance results are displayed in the map with a brighter or less transparent color. Less relevant results are displayed with a duller or more transparent marker that visually disappears into the map backdrop.

Figure 5:
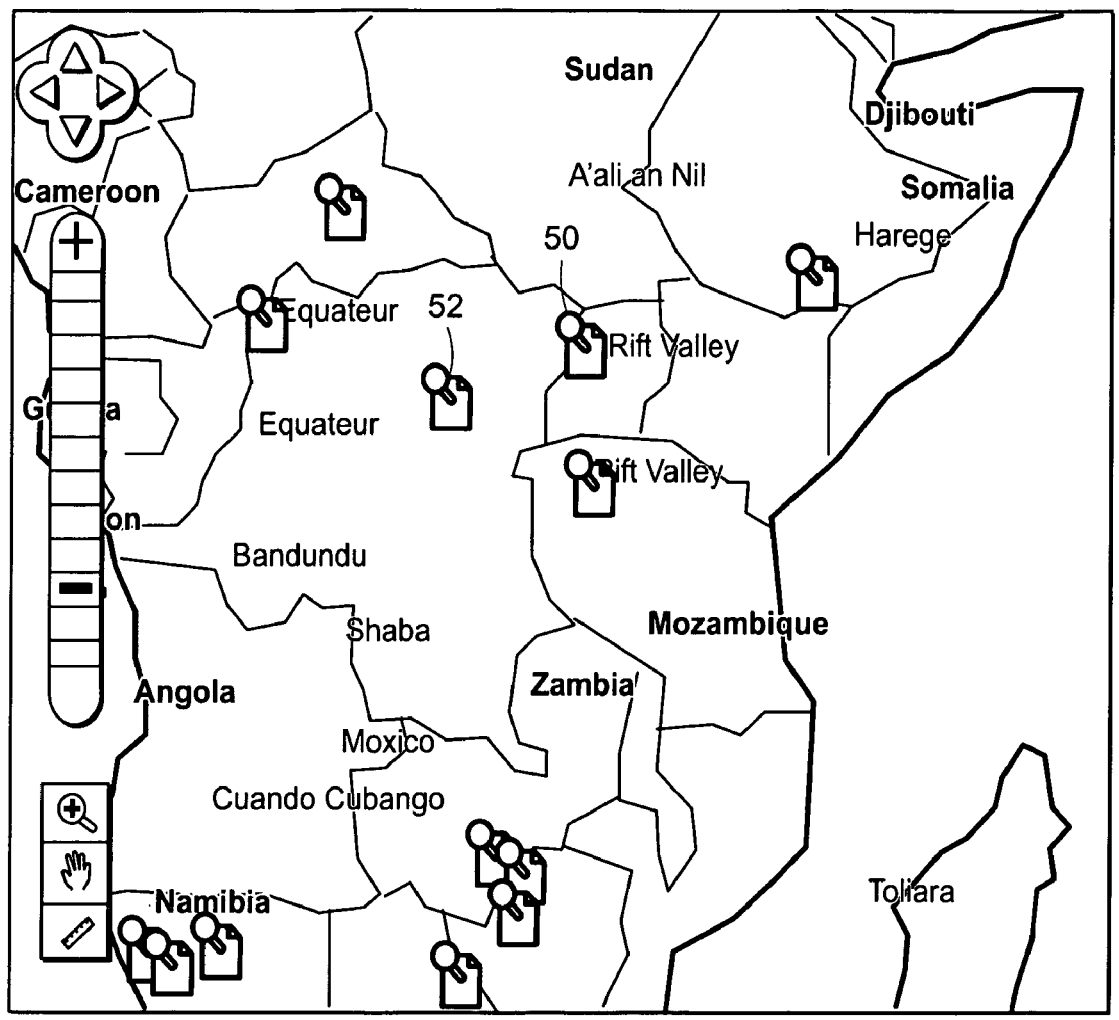
FIG. 5 shows an example of ghosting.

In FIG. 5, a map is shown with several markers of varying gradations of relevance. The best document in the list for the marker indicated by figure annotation 50 is higher relevance than the best document in the list for the marker indicated by figure annotation 52 by virtue of its being displayed as a more opaque icon. In other words the less relevant the documents are, the more transparent is the icon that is used to represent them.

Result List and Map Marker Visual Highlighting

When the user hovers the pointer over a document listed in the result list, the GUI indicates which symbols in the map correspond to that document by expanding the size of the symbols. The GUI might also shake, shrink, or otherwise cause motion in the symbols corresponding to that document. Since most documents refer to multiple locations, when a user hovers the pointer over a document in the result list, the GUI highlights/moves multiple symbols in the map.

Figure 6:
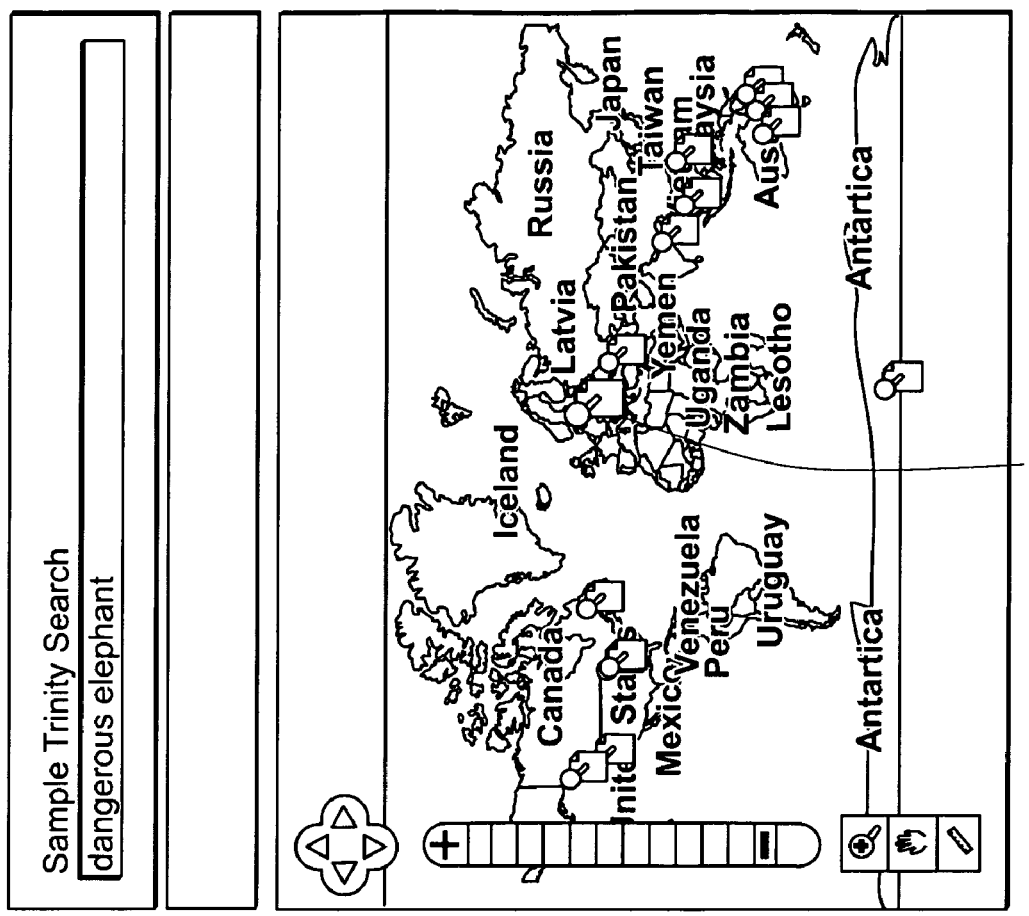
FIG. 6 shows an example of map marker visual highlighting.

In FIG. 6, the effect of holding the cursor over a result item in the list area (ref. 56) is an indication in the map of which markers correspond to that result item, such as changing the size of the marker (ref. 58).

Similarly, when the user hovers the pointer over a symbol in the map, it causes the corresponding documents in the result list to highlight in yellow. Since multiple documents might refer to the same point, multiple documents might highlight in response to the same mouse action.

In FIG. 7, the effect of holding the cursor over a map marker (ref. 60) is an indication in the list area of which list items correspond to that map marker, such as highlighting that result item (ref. 62).

As the user pans the map by grabbing and sliding it with the pointer tool, the GUI can be configured to automatically update the result list and symbols in the map. As new results come into view, the waterlevel can be configured to adapt dynamically such that the best N documents are always above the waterline. This can cause results to deactivate when higher relevance results come into view. Conversely, as the user moves away from higher relevance results, previously deactivated results can become activated.

The user-selectable page fold and the map area waterlevel are intimately related. They are two representations of the same adjustable threshold allowing the user to adjust their desired level of clutter.

Blurbs Combining Multiple Extract Texts

When a user clicks on an activated result marker, a popup bubble appears containing text from documents that refer to locations underneath that result marker. Unlike previous designs, which could only present the best document about any given location, the GUI described here allows the user to click an arrow in the popup bubble to view more results about the area indicated by the marker.

Figure 8:
FIG. 8 shows an example of a blurb (or popup) that is generated by clicking on a particular map marker or icon.

In FIG. 8, a map marker 64 has been selected by a user clicking on it. This causes a popup 66 to appear. The popup shows text 68 from a document that refers to some location under that map marker.

Figure 9:
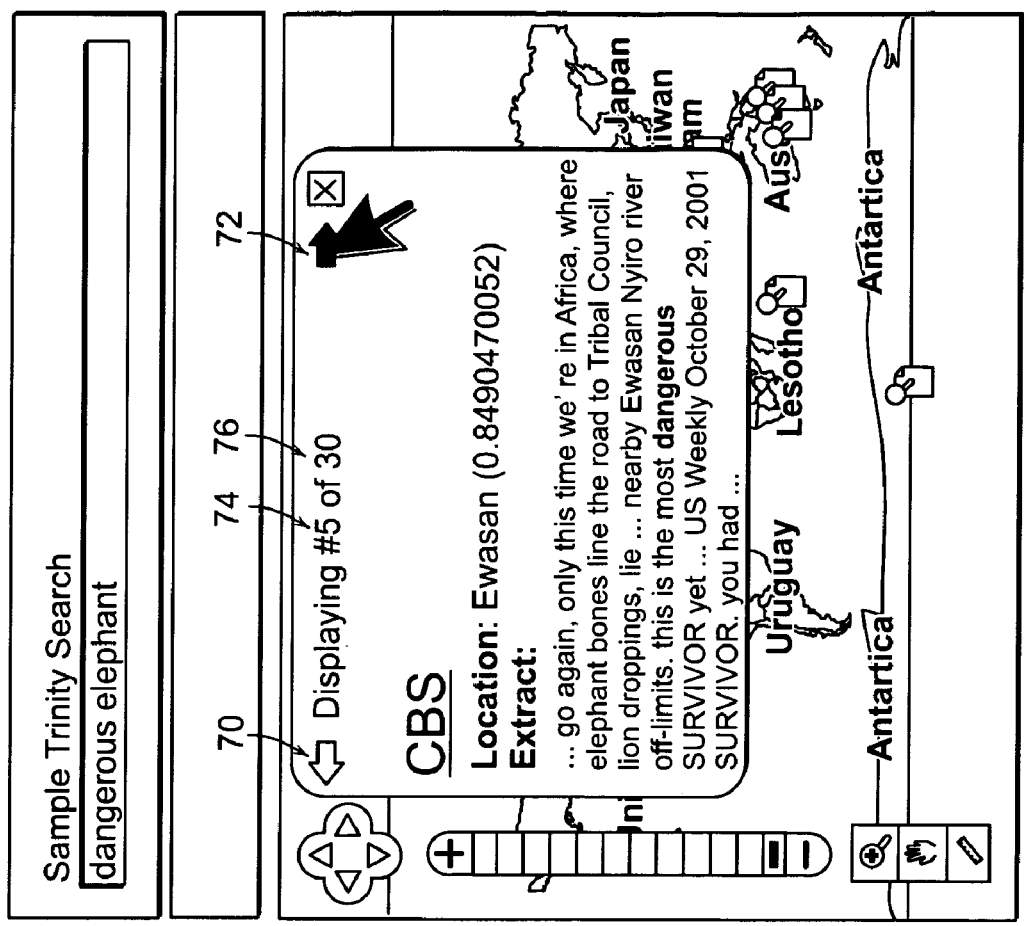
FIG. 9 shows the control buttons and information that is displayed in the blurb or popup.

As illustrated in FIG. 9, the popup allows the user to scroll forward through the results that reference locations under that marker. In this embodiment, the visual elements that allow the user to do this scrolling forward are a back arrow 70 and forward arrow 72. The popup also offers a count 74 of which extract is presently in view. The ordering of the extracts in the popup is determined by their relevance ranking. The total number of document-location tuples that match the user's query and represented by this marker is also presented (see ref. #76).

Since a map marker could cover pixels that represent a very large area of real physical space, the number of extract texts that might appear in a popup could be very large. Any of the locations under the marker or under the central pixels in the marker could be referenced by a document matching the user's query.

In a variation on this popup annotation, multiple extract texts from different documents are combined automatically to produce a flowing annotation with "side note" numbers. Each snippet of text from a given document ends with a number in superscript that corresponds to number listed next to the document result that contributed that snippet of text to the annotation. We call an annotation created from multiple documents a "blurb."

The side-note numbers can be dynamically generated at the moment that the popup appears. If the results are already numbered, then those numbers can be used to identify the snippets of text in the blurb.

User Validation of Map Labels

As described in U.S. Ser. No. 60/694,614, filed Jun. 28, 2005 and U.S. Ser. No. 60/812,865 filed Jun. 12, 2006, the GUI allows the user to correct the geographic references and snippets of text generated by the automatic GeoParser engine.

Most of the systems described herein utilize a GeoParsing engine to automatically identify strings of characters that refer to geographic locations. When a human reads a document, they use their understanding of natural language and the subject matter of the text to recognize the meaning of words and phrases in the text. This human understanding process copes with ambiguity and makes decisions about the meaning. Typically, people can figure out the authors intended meaning with high certainty. For example, a human reader can understand the difference between these references to places called "Paris:"

President Bush visited families in the little town of Paris on his way to a rally in Galveston. Next week he will attend a birthday celebration for the president of France at his home on the outskirts of Paris.

When the GeoParser marks a piece of text as referring to a geographic location, the software is often not certain that the author really intended to refer to that particular location or even that the author intended to refer to a location at all. To cope with this, the GeoParser engine also provides a confidence score with each georeference that it postulates. These confidence scores are numbers that can be compared. Often, they are probabilities that can be interpreted as the likelihood that the author really did intend this. This confidence scores allow automated systems to present users with the most likely information first and less confident information second.

Typically, a GeoParsing engine performs two steps: extraction and resolution. In the extraction step, the system decides which pieces of text refer to geographic locations. In the resolution step, the system decides which location the author meant by that string. The resolution step can produce multiple candidate answers with different confidence scores. Often, the highest confidence alternative is correct, but not always.

Probabilistic confidence scores range between zero and one. Most text is ambiguous and >90% confidence georeferencing is often not possible, even for state of the art systems.

All probabilities tend to occur frequently. That is, a GeoParser will often assign probabilities of 0.1, 0.2, 0.3, . . . 0.9, and all numbers in between.

Typically, when a user encounters an automatically generated georeference, the human can reach a higher degree of confidence than the automated system did. In fact, humans can resolve many georefs with essentially perfect certainty with little or no access to additional reference material, such as a gazetteer or map. Our Tag Corrector GUI helps users feed their understanding back into the GeoParsing engine, so that it can produce better information in the future.

It is called the "tag" corrector because GeoParsers typically generate XML or other types of syntactic markings to indicate which strings are georefs and to which locations it thinks they refer. These XML marks are called "tags," and the Tag Corrector allows the user to fix errors by adjusting the tags or other marking indicators.

There are several contexts in which a Tag Corrector GUI is useful. The basic process of these various GUIs is similar:

1. An information system presents a user with pieces of information, some of which was generated by an automatic GeoParser. Examples include a geographic search GUI or an Article Mapper GUI.
2. The user recognizes that a particular georeference is not correct or has marked with lower confidence than the user's own confidence of the meaning. Using the example above, an automatic GeoParsing engine might mark the first reference to Paris as probably meaning Paris, France, which is wrong, and might mark the second reference as meaning Paris, France but with less than a probability of 1.0.
3. The Tag Corrector GUI makes it easy for the user to change the tags. Possible changes include:
    a. Deleting a tag
    b. Extending or reducing the range of characters included in the tag
    c. Changing the confidence score of the tag
    d. Changing the location to which the tag refers
    e. Improving the precision of the location definition.
4. The crucial step in the Tag Corrector workflow is sending these pieces of information back to the GeoParser engine, so that it can make use of them. This is implemented with an HTTP POST across a network to a server hosting the GeoParser.

The GeoParser takes advantage of this humanchecked information in several ways. If another user is to be presented with the same information, e.g. because they requested the same document, the GeoParser can send the humanchecked form of the information instead of regenerating the same wrong answers. If humans disagree with results previously checked by other humans, the GeoParser can indicate how many humans agree with a particular interpretation.

The GeoParser engine can also "learn" from the human checked information in order to perform better on other documents that have not yet been manually checked. As is common in the art of machine learning, algorithms such as hidden Markov models and neural networks can utilize statistics gathered from manually checked documents to automatically analyze other documents. Such procedures are typically called "training." By incorporating more manually tagged information into the training process, the machine learning system typically performs better.

It is possible to automatically dump manually checked documents directly into a GeoParser for automatic training without human guidance. Often, a human engineer can adjust the machine learning system to take better advantage of manually tagged documents. It is often necessary to have a second layer of human auditing, i.e. people checking the information sent back to the system through the Tag Correcting GUIs. These people help ensure the quality of the corrected tags.

Our Tag Corrector GUIs gather information that can be used in all of these processes.

The two crucial features of our various Tag Corrector GUIs are that they make it easy for the user to change some aspect of the automatic information, and they send this information back to the server. Our Tag Corrector GUIs include the following specific types:

A listing of results to a search query often contains snippets of text extracted from documents that match the query. If the snippet of text contains a string of characters entered by the user, it is common in the art to highlight these substrings with a different color text or bold face. Geographic search introduces a new facet, because the user typically specifies their geographic region of interest by selecting a map view.

While the search engine can be 100% certain that a document does or does not contain a string of characters entered by the user, the search engine must accept the less then perfect certainty of the GeoParsing when associating documents with the map. These associations only have the probabilistic confidence assigned by the GeoParser. Thus, it is useful to do more than just highlight the purportedly geographic strings in the extract text. Our Tag Corrector GUI for search results puts little thumbs-up and thumbs-down icons in the search results. For example, this extract text might appear in a list of search results for the words "travels" and "water" with a map that covered the Middle East.

In FIG. 10, visual elements in the interface allow the user to approve (see up-thumb icon 80) or disapprove (see down-thumb icon 82) of a geographic references.

This type of GUI is easily implemented with javascript running in the user's web browser. When a user clicks a thumbs-up icon, the javascript listening for clicks on that icon changes that location tag's confidence to 100% and immediately sends that information to the GeoParser server. When a user clicks a thumbs-down icon, the javascript listening for clicks on that icon removes the corresponding location tag by setting its confidence to 0. In the example above, a user would naturally click the thumbs-up on Oman and the thumbs-down on the Mohammed tag, because it is obviously a reference to the prophet himself and not to one of the small towns named after the prophet.

These icons gather feedback with a single click from the user.

A more sophisticated Tag Correcting GUI gives the user more control over the changes. For example, this Tag Correcting GUI is useful in Article Mapper type GUIs.

In FIG. 11, visual elements allow the user to see the confidence of a geographic interpretation (see label 84) and to adjust the character range from which the interpretation was drawn by making it start earlier (see start marker 86) or later (see end marker 88).

By clicking on the arrows and dragging them, the user can widen or narrow the string of text that has been tagged. By grabbing an arrow and dragging it all the way to the other arrow for the same tag, the user can close a tag. Also, clicking on an arrow and hitting the delete key deletes the tag. The little boxes indicate the confidence of the tag. The user can put the cursor in a box and type a different number, such as 1.0 or any other confidence they feel is appropriate. This text might be edited to look like shown in FIG. 8.

In FIG. 12, the user has changed the state of the system from that shown in FIG. 11 by changing the confidence to 1.0 (see label 90) and by sliding the start position to an earlier character position (see start marker 92). The end position (see marker 94) has not moved. The figure shows similar georefs.

The two Tag Correcting GUIs discussed above focus on the text. It is also useful to let the user change the geographic meaning of the tag. Thumbnail images help with this. The GUI represents each geographical location represented in the text by a corresponding thumbnail showing a map of that location. If the user disagrees with the location shown in the thumbnail near the highlighted text, he clicks on the image to launch a tool for moving the location marker or expanding it into a polygon or line that better represents the real location.

These changes are sent back to the server, so they can be incorporated into the gazetteer information used by the GeoParser.

In FIG. 13, the user is shown map images 96a and 96b of the locations referenced in the text, so they can see whether the automatic system has chosen the correct location. If not, they can click on the image to launch a tool for choosing a different location.

The system also allows the user to rapidly create new documents about particular areas by selecting a set of extracted results. One way of letting the user choose a set of results from a geographic text search output is to put checkboxes 200 next to the results and let the user choose which to combine, as illustrated in FIG. 16A. After choosing a set of documents by checking the desired boxes (see reference number 202), the user can push a "combine results" button 204. The GUI then presents the user an editable page 210, like a wiki (as shown in FIG. 16B). Preloaded into this page are extract texts 212 from the documents that were checked and links 214 to the original documents. The user can then edit this text and synthesize a new report. As the user edits the page, the GUI checks the words entered by the user to see if they might be geographic, and if so, it prompts the user to insert fully validated location information. This allows users to create precisely geolocated content and to combine content from other sources while maintaining links to them.

The GUI also includes an "Add More Snippets" button 214 which enables the user to go back to the previous view and select more snippets to add to the document. Once the user is satisfied with final version, the GUI enables him to save it by clicking on a "Save" button 216.

User Creation of GeoTags:

It is also useful for the user to be able to create totally new tags on pieces of text that the GeoParser or GeoTagger either failed to find or has not yet been asked to process. When creating a new geotag, the user is able to define the range of characters in the text that they believe refers to a geographic location, and then by interacting with a map or other GUI element the user can tell the system a geographic interpretation for those characters. This input of geographic interpretation could be simply clicking on a location in the map so that the system can associate the approximate latitude-longitude coordinates of that map click on the string. More sophisticated ways of inputting a location include clicking multiple times to input a polygon or polyline, or selecting from a list of geographic feature types, e.g. "river" or "island", or selecting from a hierarchy of regions to specify the containing parent region of the entity named by these characters, or selecting from a list of already known locations to indicate that these characters are a synonym for an already known location.

Figure 14A:
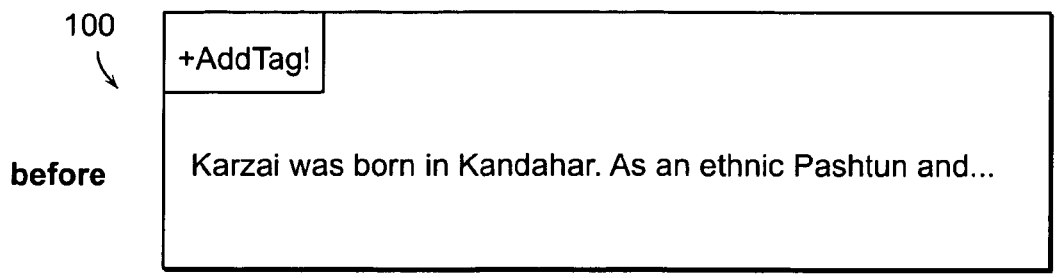
FIGS. 14A-C illustrate how the interface enables a user to generate a tag.
Figure 14B:
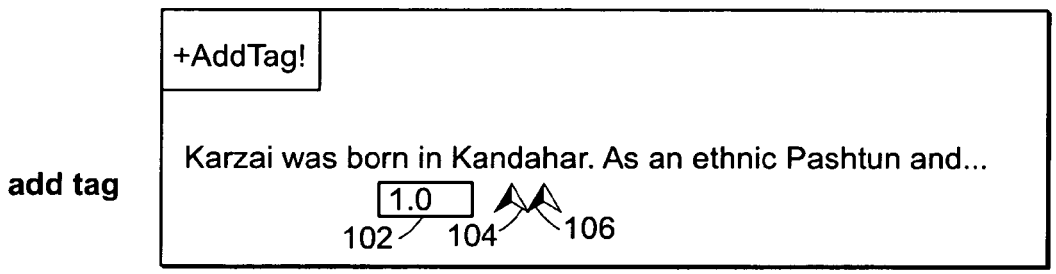
Figure 14C:
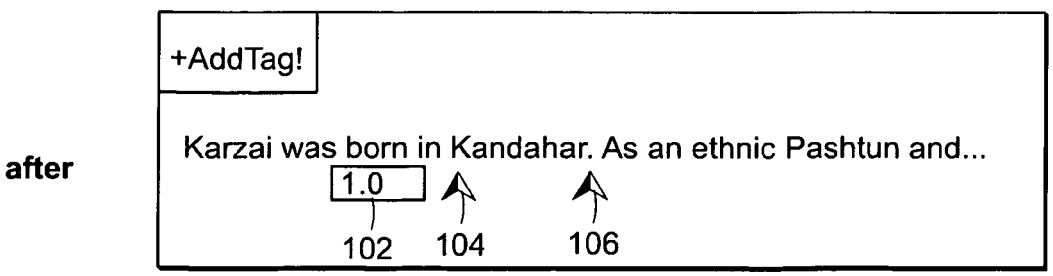

FIGS. 14A-C illustrate how the user executes this function. Initially the user selects the text for which a tag is to be generated (FIG. 14A). The selected text is presented in a box with an "AddTag" field 100. Upon clicking on the "AddTag" field, the interface generates a confidence label 102 with an initial value of 1.0 and a set of markers, namely, a start marker 104 and an end marker 106 (see FIG. 14B). The user then moves start and end markers 104 and 106 to bracket the georeference (see FIG. 14C) to thereby create the new tag.

Our system sends this newly created tag to the GeoParser so that it can use it in the future. The GeoParser can use the newly created tag to recognize the new location and name in other documents. It can also use the new tag when someone asks for this same document again.

Snap-to-Add Annotation

The GUI allows the user to make a search result a permanent annotation in the map, so that the map can be saved as a customized report. The GUI also allows the user to edit the extract text in the "snapped in" annotation. We call this "snap-to-add" annotation because the GUI snaps the popup down onto the map to make it part of the map layer. When the user sees a piece of text extracted from the document that is very important to understanding that particular area, they can decide to incorporate that text directly into the map instead of leaving it separate in the popup.

For example, if the user is studying a map of Egypt and finds a popup in the middle of an area of the map that appears to be blank, and upon reading the text in that popup the user discovers that in fact the Sphinx is located at this spot, then the user can take text from the popup, such as "Sphinx monument" and snap that text onto the map as a piece of permanent map annotation for future map readers to see. This collaborative process requires the server to store the annotations along with the other map data.

Figure 15B:
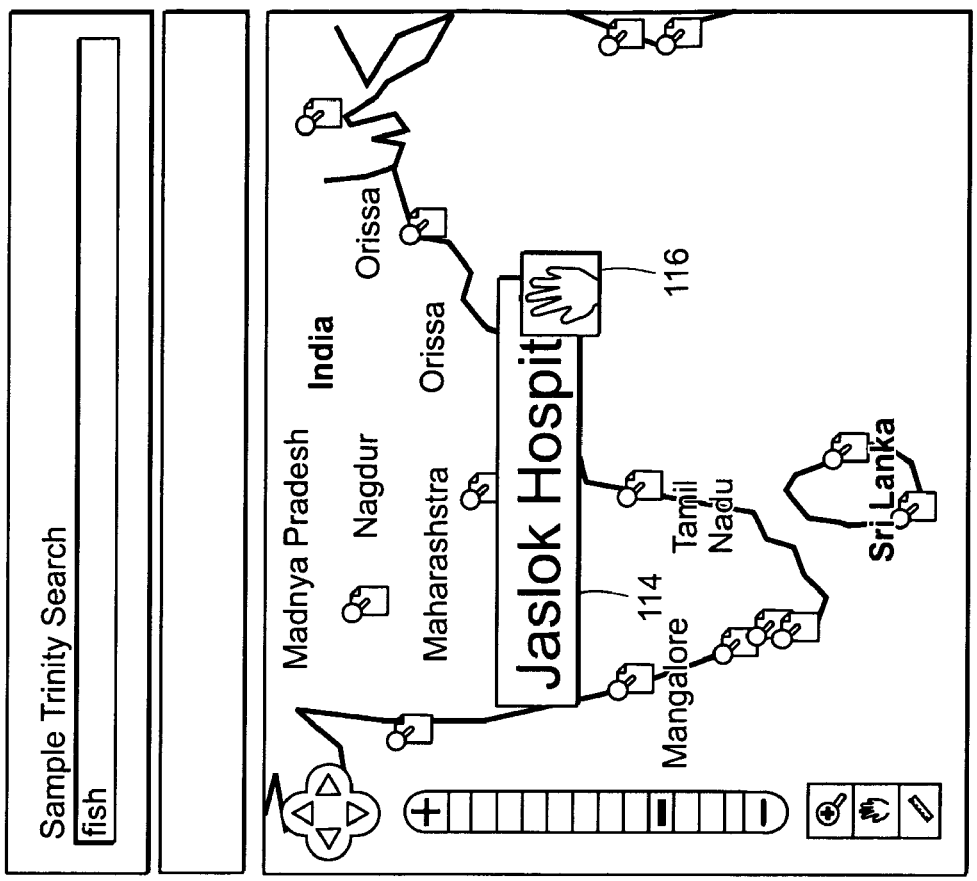

FIGS. 15A-B illustrates how the user executes this function. Upon clicking on a marker on the map, a popup 110 for the set of documents associated with that marker appears on the map (see FIG. 15A). In this case, the user has scrolled to document no. 15 of 383 which presents information about the Jaslock Hospital, which is located in Mumbai, India, which is the location of the map marker. In this example, the user feels that it is important to place that name of that hospital on the map as a permanent indictor. So, he selects the name of the hospital and the user interface creates a label 114 along with a hand icon 116 (see FIG. 15B). Then, using hand icon 116, the user moves that label to the corresponding location marker and releases it. In response, the interface generates a permanent label in the map at the selected location, i.e., Mumbai, India.

The above-described methods or algorithms are typically performed on appropriately programmed computers. As is well known, such computers commonly have non volatile storage, such as disk drives or CD-ROM, in which the program code and the data (e.g. values for confidences, documents, etc.) is stored and they also include some form of RAM into which the executable program code and variable values are loaded for execution. Such computers also include output devices such as visual display monitors and printers by which the results can be immediately presented to the user. The system may be a implemented on a local computer system. It can also be implemented on a distributed or networked system in which a client computer communicates with a server over a network, e.g. the Internet, with the geoparser and geotagger functions implemented on the server and the GUI implemented via a browser that runs on the client computer. As is well known to persons of ordinary skill in the art, other configurations are also possible.

Other embodiments are within the following claims.

What is claimed is:

1. A computer-implemented method comprising:
    using a geoparser engine to identify one or more potential geographic references within a document, and to generate respective geotags associated with the identified geographic references;
    determining to display on a visual display device a visual representation of the geotags along with the associated geographic references;
    providing a user interface that facilitates one or more of a change of at least one of the displayed geotags, and a specification of one or more additional geographic references within the document and of additional respective geotags associated with the additional geographic references; and
    determining to send the one or more of the change(s) to the displayed geotags, and the specification of additional geographic references and additional respective geotags to the geoparser engine for one or more of display on the visual display device within the visual representation and future use by the geoparser engine;
    wherein each of the geotags includes a relevance, parameter for assessing a pertinence of the geotag with respect to the document, or a confidence parameter for assessing a relevance of the geotag with respect to the associated geographic reference, or a combination thereof.

2. The method of claim 1, wherein an enabled change includes deletion of a geotag.

3. The method of claim 1, wherein an enabled change includes extending or reducing a range of characters.

4. The method of claim 1, wherein an enabled change includes the confidence parameter of a selectable one of the displayed geotags.

5. The method of claim 1, wherein an enabled change includes changing a location to which the geotag refers.

6. The method of claim 1, wherein an enabled change includes improving precision of a location definition.

7. The method of claim 1, wherein the determining to display further comprises:
    determining to display the relevance parameter, the confidence parameter, or a combination thereof, and a location of the associated geographic reference for at least one of the displayed geotags.

8. The method of claim 1, wherein received changes are utilized as a training set to modify performance of the geoparser engine.

9. The method of claim 1, wherein providing an interface enables the user to change information supplied by any displayed geotags.

10. A non-transitory computer-readable storage medium carrying one or more sequences of one or more instructions which, when executed by one or more processors, cause an apparatus at least to perform the following steps:
    using a geoparser engine to identify one or more potential geographic references within a document, and to generate respective geotags associated with the identified geographic references;
    determining to display on a visual display device a visual representation of the geotags along with the associated geographic references;
    providing a user interface that facilitates one or more of a change of at least one of the displayed geotags, and a specification of one or more additional geographic references within the document and of additional respective geotags associated with the additional geographic references; and
    determining to send the one or more of the change(s) to the displayed geotags, and the specification of additional geographic references and additional respective geotags to the geoparser engine for one or more of display on the visual display device within the visual representation and future use by the geoparser engine;
    wherein each of the geotags includes a relevance, parameter for assessing a pertinence of the geotag with respect to the document, or a confidence parameter for assessing a relevance of the geotag with respect to the associated geographic reference, or a combination thereof.

11. The non-transitory computer-readable storage medium of claim 10, wherein an enabled change includes deletion of a geotag.

12. The non-transitory computer-readable storage medium of claim 10, wherein an enabled change includes extending or reducing a range of characters.

13. The non-transitory computer-readable storage medium of claim 10, wherein an enabled change includes changing the confidence parameter of a selectable one of the displayed geotags.

14. The non-transitory computer-readable storage medium of claim 10, wherein an enabled change includes changing a location to which the geotag refers.

15. The non-transitory computer-readable storage medium of claim 10, wherein an enabled change includes improving precision of a location definition.

16. The non-transitory computer-readable storage medium of claim 10, wherein the determining to display further comprises:
    determining to display the relevance parameter, the confidence parameter, or a combination thereof, and a location of the associated geographic reference for at least one of the displayed geotags.

17. The non-transitory computer-readable storage medium of claim 10, wherein received changes are utilized as a training set to modify performance of the geoparser engine.

18. An apparatus comprising:
- at least one processor; and
- at least one memory including computer program code for one or more programs;
- the at least one memory and the computer program code configured to, with the at least one processor, cause the apparatus to perform at least the following:
- use a geoparser engine to identify one or more potential geographic references within a document, and to generate respective geotags associated with the identified geographic references;
- determine to display on a visual display device a visual representation of the geotags along with the associated geographic references;
- provide a user interface that facilitates one or more of a change of at least one of the displayed geotags, and a specification of one or more additional geographic references within the document and of additional respective geotags associated with the additional geographic references; and
- determine to send the one or more of the change(s) to the displayed geotags, and the specification of additional geographic references and additional respective geotags to the geoparser engine for one or more of display on the visual display device within the visual representation and future use by the geoparser engine;
- wherein each of the geotags includes a relevance, parameter for a assessing pertinence of the geotag with respect to the document, or a confidence parameter for a assessing relevance of the geotag with respect to the associated geographic reference, or a combination thereof.

19. The apparatus of claim 18, wherein an enabled change includes deletion of a geotag.

20. The apparatus of claim 18, wherein an enabled change includes extending or reducing a range of characters.

21. The apparatus of claim 18, wherein an enabled change includes changing the confidence parameter of a selectable one of the displayed geotags.

22. The apparatus of claim 18, wherein an enabled change includes changing a location to which the geotag refers.

23. The apparatus of claim 18, wherein an enabled change includes improving precision of a location definition.

24. The apparatus of claim 18, wherein the determination to display further comprises:
- a determination to display the relevance parameter, the confidence parameter, or a combination thereof, and a location of the associated geographic reference for at least one of the displayed geotags.

25. The apparatus of claim 18, wherein received changes are utilized as a training set to modify performance of the geoparser engine.

* * * * *